(12) United States Patent
Devine

(10) Patent No.: US 8,575,770 B2
(45) Date of Patent: Nov. 5, 2013

(54) SYSTEMS AND METHODS FOR PRODUCING, SHIPPING, DISTRIBUTING, AND STORING HYDROGEN

(71) Applicant: Timothy J. Devine, Ojai, CA (US)

(72) Inventor: Timothy J. Devine, Ojai, CA (US)

(*) Notice: Subject to any disclaimer, the term of this patent is extended or adjusted under 35 U.S.C. 154(b) by 0 days.

(21) Appl. No.: 13/783,446

(22) Filed: Mar. 4, 2013

(65) Prior Publication Data

US 2013/0175798 A1    Jul. 11, 2013

Related U.S. Application Data

(62) Division of application No. 11/936,011, filed on Nov. 6, 2007, now Pat. No. 7,911,071.

(51) Int. Cl.
*F03D 9/00* (2006.01)

(52) U.S. Cl.
USPC .............................................. 290/1 R; 290/2

(58) Field of Classification Search
USPC .................. 290/1 R, 1 A, 2, 4 A; 60/408
See application file for complete search history.

(56) References Cited

U.S. PATENT DOCUMENTS

| | | | | |
|---|---|---|---|---|
| 7,911,071 B2* | 3/2011 | Devine | .......................... | 290/1 R |
| 8,203,225 B2* | 6/2012 | Devine | .......................... | 290/1 R |
| 8,415,814 B2* | 4/2013 | Devine | .......................... | 290/1 R |
| 2009/0115190 A1* | 5/2009 | Devine | .......................... | 290/44 |
| 2011/0169269 A1* | 7/2011 | Devine | .......................... | 290/55 |
| 2012/0313379 A1* | 12/2012 | Devine | .......................... | 290/1 A |

* cited by examiner

*Primary Examiner* — Nicholas Ponomarenko

(57) ABSTRACT

These inventions related to systems and methods for producing, shipping, distributing, and storing hydrogen. In one embodiment, a hydrogen production and storage system includes a plurality of wind turbines for generating electrical power; a power distribution control system for distributing, and converting the electrical power from the wind turbines, a water desalination and/or purification unit which receives and purifies seawater, and an electrolyzer unit that receive electrical power from the power distribution system and purified water from the desalination units and thereby converts the water into hydrogen and oxygen. After its production, hydrogen is stored, transported, and distributed in accordance with various embodiments.

5 Claims, 19 Drawing Sheets

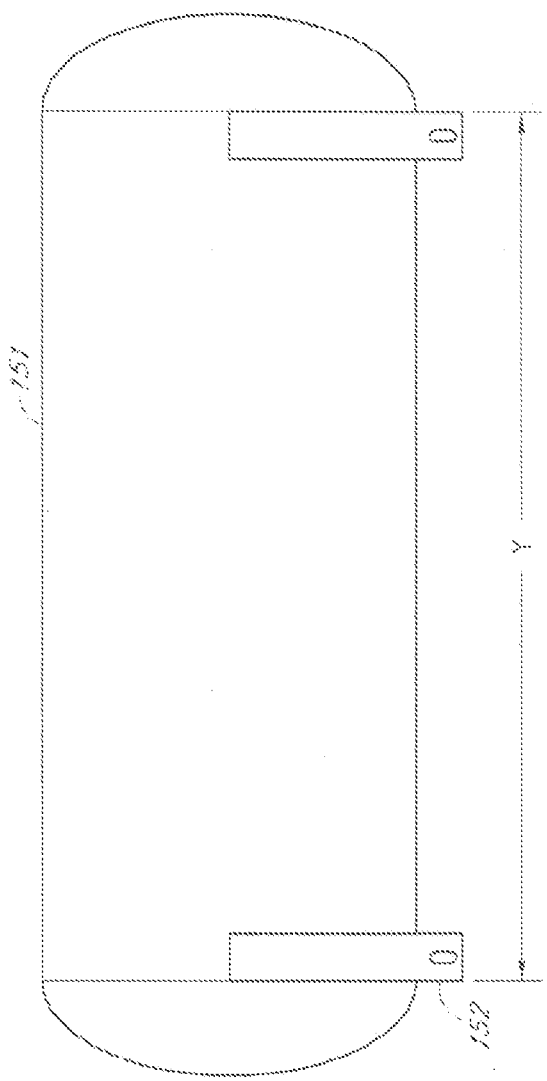
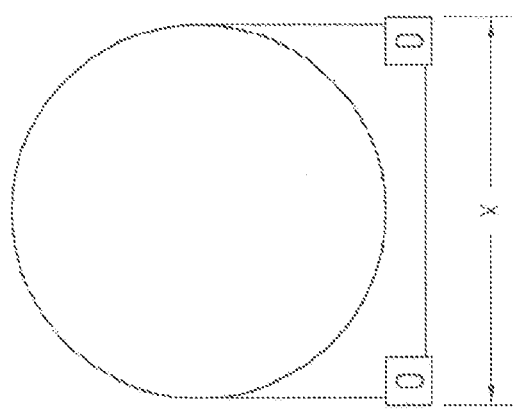
FIG. 11

SYSTEMS AND METHODS FOR PRODUCING, SHIPPING, DISTRIBUTING, AND STORING HYDROGEN

CLAIM OF PRIORITY

This application is a divisional application from U.S. patent application Ser. No. 11/936,011, filed Nov. 6, 2007, which is incorporated in its entirety by reference herein. And U.S. patent application Ser. No. 13/052,665 filed Mar. 21, 2011, which is incorporated in its entirety by reference herein. And U.S. patent application Ser. No. 13/523,889 filed Jun. 15, 2012, which is incorporated in its entirety by reference herein.

BACKGROUND OF THE INVENTION

1. Field

These inventions relate to systems and methods for producing, shipping, distributing, and storing hydrogen.

2. Description of the Related Technology

Wind is the movement of air, which has mass, and when air is in motion, it contains kinetic energy. A wind energy system converts the kinetic energy of wind into mechanical or electrical energy that can be harnessed for practical use. Mechanical energy harnessed by windmills, for example, can be used for tasks such as pumping water for a well. Wind energy systems which harness the kinetic energy of the wind and convert it to electrical energy are generally referred to as wind turbines. As air flows past the rotor of a wind turbine, the rotor spins and drives the shaft of a gear box which in turn drives an electrical generator to produce electricity. The electricity generated by a wind turbine can be collected and fed into utility power lines, where it is mixed with electricity from other power plants and delivered to utility customers.

While it is known that energy derived from wind systems may be converted to energy of various forms, it is not common for electrical energy produced from wind turbines to be used in the production of hydrogen from the electrolysis of water. Hydrogen does not occur free in nature in useful quantities. It has to be made. One way to make hydrogen is to split the water molecule $H_2O$ to get the hydrogen. As this is typically an inefficient process, hydrogen is an energy transfer medium rather than a primary source of energy.

Hydrogen is the lightest of the elements with an atomic weight of 1.0. Liquid hydrogen has a density of 0.07 grams per cubic centimeter, whereas water has a density of 1.0 g/cc and gasoline about 0.75 g/cc. Advantageously, hydrogen stores approximately 2.6 times the energy per unit mass as gasoline. In addition, the burning of hydrogen produces no carbon dioxide ($CO_2$) or any other green house gasses.

At present, hydrogen is mostly produced by steam methane reforming, and this will probably remain the most economical way as long as methane (natural gas) is available cheaply and in large quantities, and hydrogen is required only in small quantities. However, with dwindling supplies of methane, hydrogen will need to be obtained by splitting water $H_2O$ into hydrogen $H_2$ and oxygen $O_2$.

Typically, users of wind energy systems convert the wind energy into electrical energy and use the electrical energy directly. Infrastructure such as power lines can transport that electrical energy to the general population from wind turbine farms. At best, hydrogen is produced as a secondary energy source if excess electrical energy remains. Such hydrogen is usually stored and then burned to supplement electrical generation during times of low wind speeds due to a lack of infrastructure for transmission of hydrogen. However, as new infrastructure is adopted by society with an eye towards being environmentally friendly and less dependent on oil and gas resources, a significant market for hydrogen will emerge. Thus, it would be desirable to provide systems and methods for harnessing wind energy and converting such energy to hydrogen in a manner that would allow for the continuous and efficient production, storage, transportation, and distribution of hydrogen to the general public for consumption.

SUMMARY OF THE INVENTION

Described herein are methods of producing hydrogen at a hydrogen wind farm. In one embodiment, a method for controlling variability in power output of a grid independent hydrogen producing wind farm includes monitoring a power output level of the hydrogen producing wind farm, comparing the monitored power output level of the wind farm to a target power output level, the target output level being correlated to a targeted production rate of hydrogen, and commanding a change in electrical power in one or more elements of the hydrogen producing wind farm facility, the one or more elements being selected from an electrolyzer system electrically coupled to the wind farm, a desalination system electrically coupled to a wind farm, an water transfer pumps electrically coupled to the wind farm, the commanding step comprising balancing an amount of water transferred by the water transfer pumps with the amount of electricity consumed by the desalination system and the electrolyzer system. In some embodiments, the method also includes monitoring the targeted production rate of hydrogen and comparing the rate of hydrogen production to a targeted rate of power output. In some embodiments, the method further includes providing electricity generated by a converted diesel generator electrically coupled to the production facility. The purpose of such generator is a "fail safe system" It only operates when there is not enough wind generated electricity to keep computers, monitors, sensors, etc. working.

In another embodiment, a method of storing hydrogen for shipping, the method includes providing cryogenic liquid hydrogen, and storing the cryogenic hydrogen in a plurality of hydrogen storage tanks, each hydrogen storage tank is located within a standardized shipping container comprising one or more side walls, one or more bottom walls; and one or more top walls, the one or more side walls, the one or more bottom walls, and the one or more tops walls are in contact to define an interior of the container. In some embodiments, the method further includes loading each of the standardized shipping containers onto a container ship or a container truck.

In another embodiment, a method includes loading or unloading a standardized shipping container having a hydrogen storage tank inside the container. In certain embodiments, the method includes loading or unloading a container from a transportation vehicle having a storage portion having a bed configured to deliver or receive a standardized shipping container having a hydrogen storage tank disposed within; the bed comprising a railing system configured to receive a bottom portion of the standardized shipping container, the railing system comprising at least two parallel rails, each rail having one or more rollers such that the standardized shipping container may roll from a receiving/delivery position to a transport position. In some embodiments, the shipping container is locked in place by its corners while being transported. In certain embodiments, the container will have removable wheels at all four corners and two rollers or more to roll on the rails. In certain embodiments, the rollers will be at the winch end of the container.

In another embodiment, a method of distributing hydrogen at a hydrogen filling station is described. The method may include receiving a container from a transportation vehicle on a railing system configured to receive a bottom portion of the standardized shipping container, the railing system comprising at least two parallel rails, each rail having one or more rollers such that the standardized shipping container may roll from a transport position on the transportation vehicle to the delivery position at the hydrogen filling station. In certain embodiments, the method includes delivering hydrogen from the standardized shipping container to a hydrogen filling pump.

In another embodiment, systems for producing hydrogen are described. In one embodiment, a system for producing hydrogen includes a plurality of 1 to 20 MW wind turbines, the plurality of 1 to 20 MW wind turbines having a total capacity of between about 1000 to about 10000 MW output, wherein each of the plurality of wind turbines comprises a generator that produces electricity. In another embodiment, a system for producing hydrogen includes a plurality of 2.5 to 15 MW wind turbines, the plurality of 2.5 to 15 MW wind turbines having a total capacity of between about 20 to about 3000 MW output. In another embodiment, a system for producing hydrogen includes a plurality of 1 to 20 MW wind turbines, the plurality of 2.5 to 15 MW wind turbines having a total capacity of between about 50 to about 2500 MW output. The system may further include a power distribution system operatively connected to the plurality of wind turbines, the power distribution system capable of receiving electricity generated by the plurality of wind turbines. The system may further include one or more desalination units capable of receiving salt water and converting the salt water to a purified water having less than 100 ppm of total dissolved solids; the one or more desalination units operating on the electricity produced by the wind turbines and processed in the power distribution system. In some embodiments, the system includes a plurality of electrolytic cells for converting the DC electricity into hydrogen; wherein each of the plurality of electrolytic cells generates between about 200 to about 1000 Nm$^3$/hour of hydrogen; each electrolytic cell utilizing an amount of DC energy between about 3 to about 7 kWh of DC energy to produce 1 Nm$^3$ of hydrogen. In certain embodiments, the system also includes a hydrogen purification, storage and pressurization system for receiving hydrogen from the electrolyzer unit, purifying it and storing the hydrogen under pressure at normal, reduced and/or cryogenic temperatures. As described herein, the system may be configured to be grid-independent. In one embodiment, the system may further include a converted diesel generator system that is configured to operate on the hydrogen produced by the system and capable of producing electrical energy in manner such that the system is self-sustaining when wind is not sufficient to generate enough electricity to sustain all elements of the system.

In another embodiment, a power plant system includes a hydrogen storage tank, a hydrogen combustion turbine, water that receives heat from the heat of combustion of hydrogen from the hydrogen combustion turbine; and a steam turbine that receives the heated water. In some embodiments, the hydrogen storage tank comprises an outlet for delivering off-gas hydrogen from the storage tank to the hydrogen combustion turbine.

In another embodiment, a method of delivering hydrogen to a power plant is described. The method may include mooring a ship to a buoy, the buoy comprising a hydrogen receiving line in fluid connection with a power plant comprising a hydrogen combustion chamber for generating electricity, and transferring hydrogen from the ship to the hydrogen receiving line. In certain embodiments, the method may also include providing hydrogen to the ship from a hydrogen wind farm.

BRIEF DESCRIPTION OF THE DRAWINGS

FIG. 11 is a hydrogen storage and transport tank.

DETAILED DESCRIPTION OF THE PREFERRED EMBODIMENT

Figure 1:
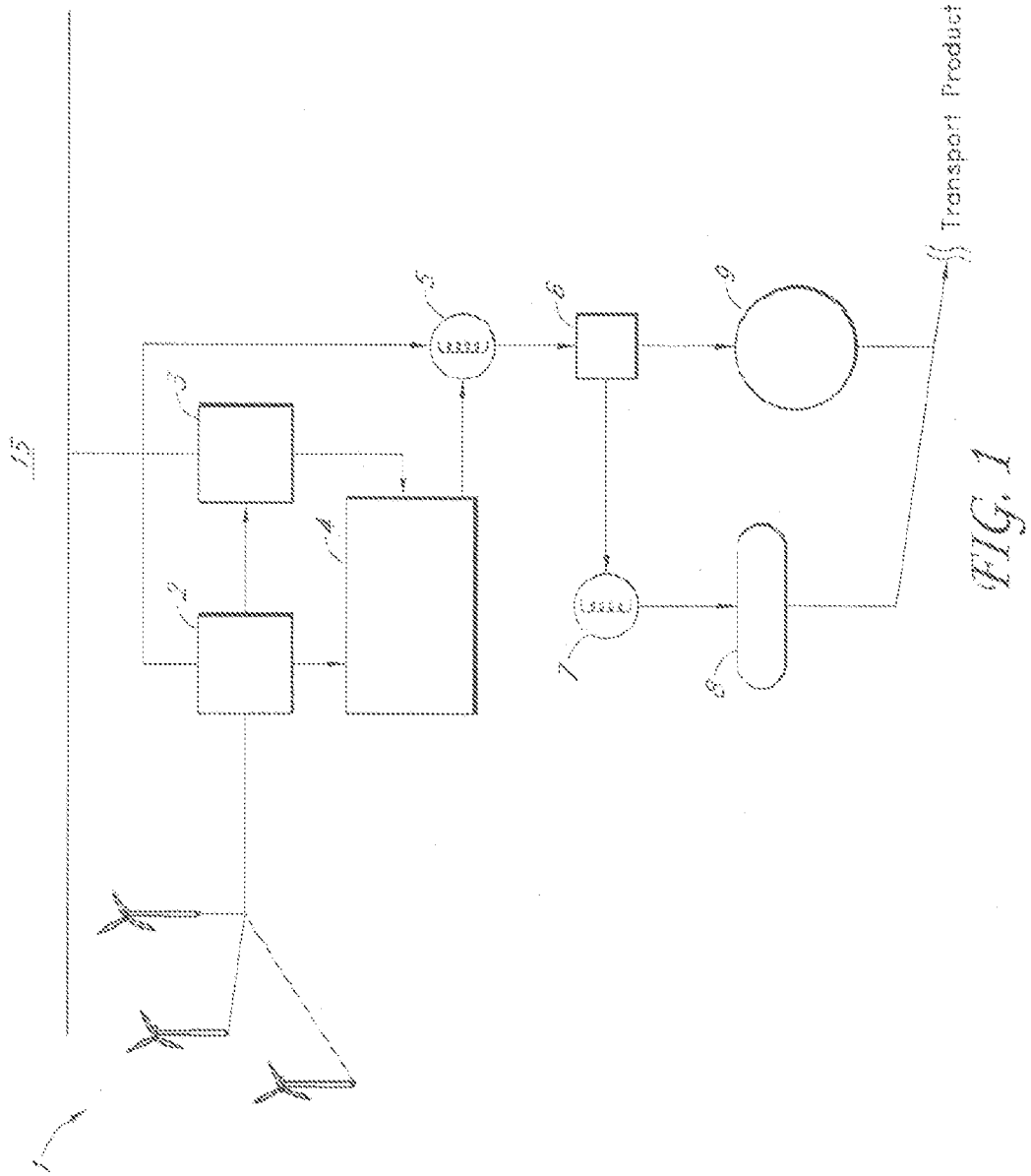
FIG. 1 is a schematic drawing of a system for the production of hydrogen.

The State of California is taking the initiative to fund and build hydrogen infrastructure. At the time of the filing of this application, California has set aside 25 millions dollars to fund infrastructure for hydrogen filling stations. This program is being administered by engineers in the California Air Resources Board, Sustainable Transportation Branch. A goal of the program is to have self-sustaining hydrogen filling stations throughout the state. Such filling stations will use power from the electrical energy grid and thus generate hydrogen on site. Applicant has discovered that such self-sustaining hydrogen stations are not economically viable.

The State of California uses about 17 billions gallons of gasoline per year throughout California. If California were to replace all of this gasoline with hydrogen, it would need 17 billion Gasoline Gallon Equivalents (GGE) per year. This amount would require approximately 51 billion gallons of fresh water a year for electrolysis. There is a very limited supply of fresh water across the state of California, and there are costs associated with transporting the water for the purpose of having self-sustaining filling stations.

The average gasoline station in California dispenses about 100,000 gallons of gasoline per month. Assuming that there would be the same number of hydrogen dispensing stations, each hydrogen station would dispense 100,000 GGE of hydrogen per month. Each GGE of hydrogen requires 50 kWh of electricity, assuming that efficient electrolyzers are used and substantially no power is required for compression or filtering. The self-sustaining hydrogen stations would thus require 5,000,000 kWh per month to produce the required amount of hydrogen. This is equivalent to the same amount of electricity that powers 10,000 homes in the state of California. With approximately 14,000 total filling stations across the state, the total power required to produce hydrogen each month is the same power required to power 141 million homes. As the State of California frequently faces energy shortages, it is not clear how such self-filling stations are feasible.

Moreover, it costs approximately $20 per GGE to produce hydrogen from the electrical power grid based on the current price of energy. Unless another way is found to generate surplus energy, these costs will only remain the same or increase over time. Thus, it is not economically feasible to produce hydrogen from the current electrical power grid.

However, Applicant has discovered that embodiments described herein result in a method of producing, shipping, distributing and storing hydrogen in an economically feasible manner. These embodiments relate to a hydrogen production system that utilizes wind turbines for the production of electrical energy, a water purification unit for receiving and purifying water, and an electrolysis system for converting the electrical energy and the purified water into hydrogen. It has been discovered that such a system can operate in a self sustaining manner if located on certain islands or adjacent to certain bodies of water. These locations generally incur wind power densities at 10 m elevation of greater than 250 W/m$^2$ of wind energy, and more preferably greater than 400 W/m$^2$, and even more preferably greater than 800 W/m$^2$. In certain localities according to some embodiments, the wind power density at 10 m elevation is greater than 1000 W/m$^2$. All of the aforementioned localities in combination with the systems described herein provide an optimal environment and system for the production of hydrogen in a self-sustaining hydrogen facility.

Moreover, the embodiments also relate to methods and systems for storing and shipping the hydrogen once produced by a wind powered hydrogen production system. In particular, embodiments relate to the storage of liquefied and/or pressurized hydrogen on site at the wind powered hydrogen production facility. The hydrogen may then be transferred to a ship for shipping away from the wind powered hydrogen production facility to a receiving facility. Particular methods of storing and transporting the hydrogen on a ship are further described herein.

Furthermore, embodiments also include methods of distributing hydrogen from the receiving facility. In some embodiments, the hydrogen is offloaded into shipping transportation vehicles which transport the hydrogen to other receiving stations which include, but are not limited to, filling stations, pump, other storage facilities and the like. In some embodiments, the transportation vehicles include compressed or liquid hydrogen tanks for storing the transported hydrogen. In certain embodiments, the transportation vehicles are also driven by the stored hydrogen. Such transport vehicles may pump hydrogen into the receiving stations or it may deliver the tank, or a container comprising the tank, to the receiving station. In some embodiments, a shipping container containing a tank may be delivered and a container with an empty tank may be removed from the receiving station.

The embodiments of the invention may be better understood by reference to the following description of each individual component which is intended for the purpose of illustration and are not to be construed as in any way limiting the scope of the invention, which is defined in the claims appended hereto. It should be further noted that each individual component or step of the invention is individually described below; however, one or more of the components or steps may be used together in certain embodiments as further discussed herein and as would be understood by a person having ordinary skill in the art upon reading this specification.

Hydrogen Production Facility

In some embodiments, a hydrogen production facility includes elements necessary to convert water, such as salt water, into liquid hydrogen by using electrical energy produced by one or more wind turbines, and then storing such hydrogen for later shipping, distribution, and utilization. The elements used to perform such production and storage includes a plurality of wind turbines, a power distribution control system, an optional water desalination/purification system, a bank of electrolyzer units, and a hydrogen storage device. One or more of the above listed components may be optional or replaced by a similar function element in the operation of the hydrogen production facility. Such hydrogen production facility will also be equipped with necessary loading docks, loading cranes, transfer lines, pipes (above and below ground) and equipment to transfer hydrogen to ships and/or load containers. In a preferred embodiment, the facility will have deep water access which allows ships to receive hydrogen directly from the facility and/or off-site storage tanks.

Referring to FIG. 1, wind farm 1 provides electrical power to power distribution system 2. Power distribution system 2 may transmit electricity to one or more components of the hydrogen production facility. As shown, power distribution system 2 provides electricity to the transfer pump 3 and desalination system 4. Transfer pump 3 may transfer salt water from the body of water 15 to desalination system 4. Power distribution system 2 may also provide electricity to the electrolysis system 5. Electrolysis system 5 receives purified water from desalination unit 4 and converts the water into hydrogen and oxygen with the electricity from power distribution system 2.

Once hydrogen has been produced, it may be immediately stored and then shipped, or further purified prior to storage. Continuing to refer to FIG. 1, hydrogen produced by electrolysis system 5 is further purified and/or compressed by the filter 6 and/or compression unit 7. In certain embodiments, the hydrogen is then stored in storage tank 9. In other embodiments, the hydrogen is compressed at compressor 7 and then stored in storage tank 8. Such stored hydrogen may then be shipped and distributed.

It is desirable to locate embodiments of the system near water and wind sources. It has been discovered that one place to use such systems and methods is on or near one or more islands, island chains, or peninsulas. In another embodiment, the systems and methods are located adjacent to bodies of saltwater. In one embodiment, the systems and methods are employed on an island or in coastal waters up to 200 feet deep and generally within 2000 meters of an island. It is desirable that such islands have a wind supply that can continuously support the wind turbines as described herein. These locations generally incur wind power densities at 10 m of greater than 250 W/m² of wind energy, and more preferably greater than 400 W/m², and even more preferably greater than 800 W/m². In certain localities according to some embodiments, the wind power density at 10 m elevation is greater than 1000 W/m². Nonlimiting examples of suitable islands and islands chains on which the systems can be located on or near include the Farallon Islands, San Miguel, Santa Rosa Island, Santa Cruz Island, San Nicolas, Island, San Clemente Island, Catalina Island, Santa Barbara Island, Anacapa Island, the Hawaiian Islands, the Marshal Islands, the Lesser and Greater Antilles, Cape Horn, the Falkland Islands, or the Aleutian Islands. In some embodiments, the wind turbines may be located in places including, but not limited to, southern Chile and Argentina, the Straits of Magellan, Tierra del Fuego, Beagle Canal and Ushuaia. It is within the scope of invention to locate various elements or modules of the facility in different locations, depending on the location and specifications of the facility. Likewise, two or more facilities may be located in different locations and work together to produce hydrogen.

Figure 2:
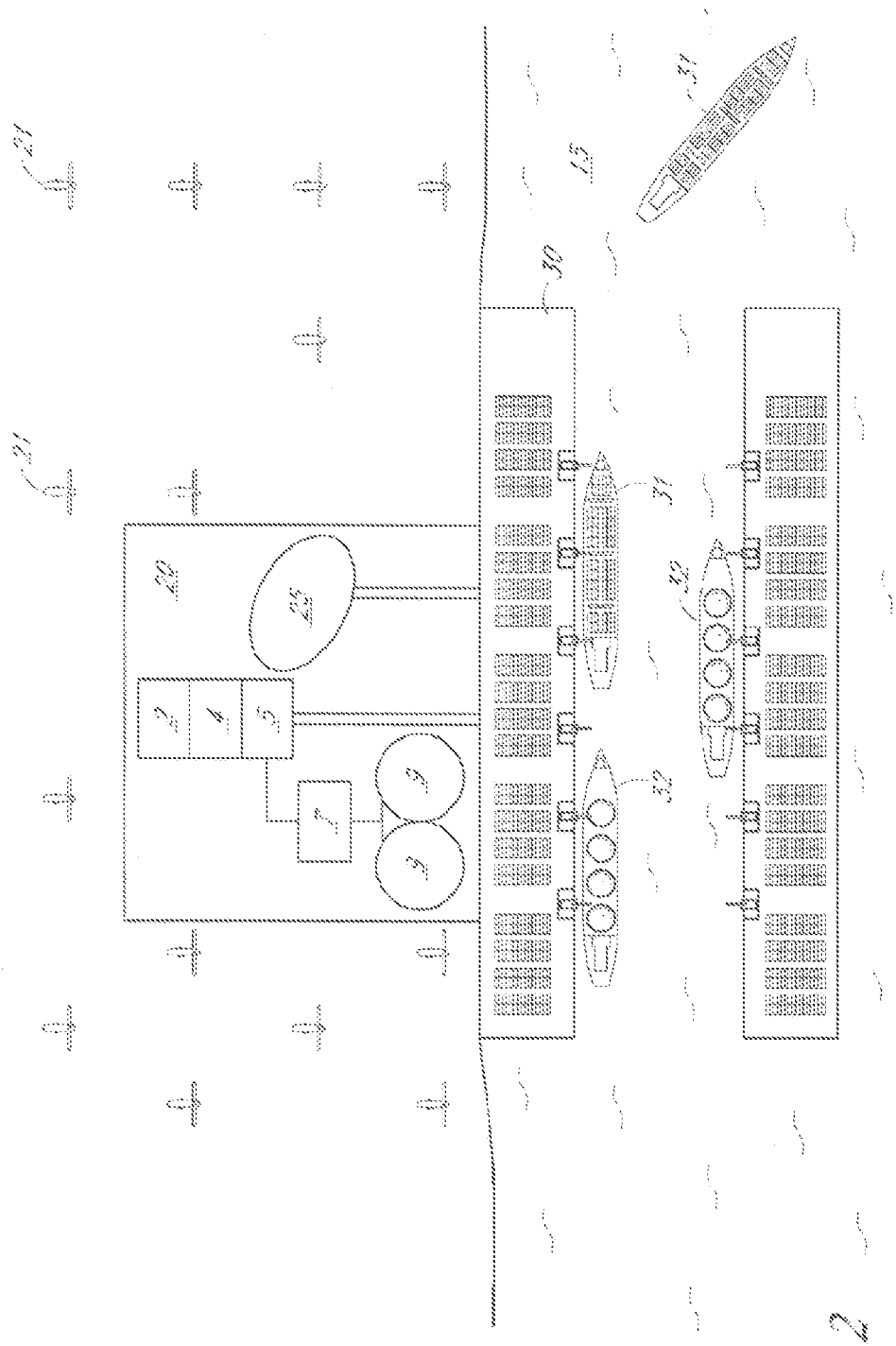
FIG. 2 is an illustration of a hydrogen production facility including wind turbines located adjacent to a body of water and a port for delivering hydrogen to ships.

Referring to FIG. 2, a hydrogen production facility 20 is located adjacent to a body of water 15. The hydrogen production facility 20 includes a plurality of wind turbines 21 which transmit electricity to facility 20. The facility 20 includes a salt water storage tank 25, power distribution system 2, desalination system 4, electrolysis system 5, and compressor 7. Other components described herein may also be present but are not illustrated. The facility 20 further includes storage tanks 9 which receive hydrogen from electrolysis system 5.

Attempts have been made to use hydrogen production facilities on islands or near water. However, these facilities are patentably distinct from the embodiments described herein for a number of reasons. The primary purpose of such projects is to use wind energy to generate electricity to meet the demand of homes. To do so, the electricity from the wind energy is transferred to a power grid that is further connected to individual homes and businesses. Typically, this occurs during high demand periods during the day. Only during low demand periods, such wind turbines are used to produce hydrogen with any excess electricity. However, even during the low demand periods the systems are still grid dependent as the demand from the grid may change and the power is redirected into the grid to supply the needs of homes and businesses.

In contrast, some embodiments of the Applicant's invention are solely dedicated to the production of hydrogen. Applicant has unexpectedly devised a grid-independent hydrogen production facility. "Grid independent" as defined herein is a broad term used in its ordinary sense and includes, without limitation, when the hydrogen production facility is not connected to a larger power generation system that would support the hydrogen production facility.

Moreover, the previously designed facilities do not produce enough hydrogen to justify the shipping of hydrogen from the island to other localities. Continuing to refer to FIG. 2, hydrogen production facility 20 also includes port 30. The port 30 is capable of receiving hydrogen from hydrogen storage tanks 9 and allocating hydrogen to ships located in the port 30. As shown, the port may accommodate container ships 31 and hydrogen ships 32. These types of ships are further described herein.

Advantageously, Applicant has discovered a hydrogen production facility capable of producing sufficient amounts of hydrogen to justify the shipping of hydrogen. In addition, the hydrogen production facility utilizes a method of producing hydrogen and allocating power which facilitates the shipping of hydrogen.

Certain elements of the hydrogen production facility are further described below. However, the disclosed elements of the hydrogen production facility are not intended to limit the scope of the invention which is described in the claims appended hereto.

A. Wind Turbines

Systems of certain embodiments include one or more wind turbines. In particular embodiments, a plurality of wind turbines create electrical power to be used in one or more of the components in the production and/or storage of hydrogen produced from the electrolyzer units. In some embodiments, the plurality of wind turbines is the sole electrical generating device for the facility. In other embodiments, electrical power for the facility may be supplemented by other electrical generating means such as a converted diesel engine generator set.

Wind turbines generally include blades that are attached to a rotating hub, which most commonly revolves around a horizontal axis. The hub is connected to a drive shaft, which transfers energy to a generator, often via a gearbox. The drive train and gear box are typically located inside a nacelle or housing, which is generally mounted at the top of a tower.

Many wind turbines have many options for their power output. In certain embodiments, the generated energy is converted to AC power in the nacelle of the turbine. In some embodiments, the voltage and frequency of the power generated by the wind turbine is set to meet the needs of the user. For example, the power output may be varied between about 440 volts or to about 12,000 volt. In some embodiments, the frequency of the current may be 50 or 60 Hz. In certain embodiments, the output frequency of the wind turbine needs to be matched to the frequency of equipment that the power is being generated for. For example, the output frequency of the wind turbine may be adjusted to provide a current frequency required to operate one or more electrical components of the facility, including but not limited to, pumps, filters, compressors, one or more electrolyzers, one or more desalination units, the power distribution and control system. In some embodiments, frequency adjustments may be controlled by the power control and distribution center. In certain embodiments, frequency adjustments may be required to operate one or more of the components of the hydrogen generation facility.

The collective energy produced from the wind turbines may vary according to the number of wind turbines and the average wind speed. Examples of certain nonlimiting embodiments are further described herein. However, it is within the skill of an ordinary artisan to scale such embodiments to a desired system and total output. In some embodiments, the plurality of wind turbines has a total annual energy yield of between about 20 to about 10,000 MW output. However, it is contemplated that certain embodiments may exceed 10,000 MW of hourly energy yield. In some embodiments, the plurality of wind turbines has a total hourly energy yield of between about 50 to about 8,000 MW output. In some embodiments, the plurality of wind turbines has a total hourly energy yield of between about 200 to about 7,000 MW output. In some embodiments, the plurality of wind turbines has a total hourly energy yield of between about 500 to about 5,000 MW output.

To generate a total output, a plurality of wind turbines may be used together. As such each wind turbine may be operationally connected to another wind turbine or the wind turbines may be connected to power distribution and control system of the facility. Wind turbines having the same or different outputs may be used depending on the applications. In some embodiments, the wind turbines comprise a plurality of 0.5 to 10 MW wind turbines. In some embodiments, the wind turbines comprise a plurality of 1 to 7 MW wind turbines. In some embodiments, the wind turbines comprise a plurality of 2 to 6 MW wind turbines. In some embodiments, the wind turbines comprise a plurality of 3 to 15 MW wind turbines. In some embodiments, the wind turbines comprise a plurality of 1 to 100 MW wind turbines. The selection of the exact output of each wind turbine may vary based on its location, the amount of wind it encounters at such location, and the relative spacing between other wind turbines.

Winds will obviously vary at the location of the wind turbines. In some embodiments, the annual average wind speed of the location of the plurality of wind turbines will be between 4 to about 25 m/s at the elevation of the wind turbine hub. In some embodiments, the annual average wind speed of the location of the plurality of wind turbines will be between 5 to about 10 m/s at the elevation of the wind turbine hub. In some embodiments, the annual average wind speed of the location of the plurality of wind turbines will be between 6 to about 9 m/s at the elevation of the wind turbine hub. In some embodiments, the annual average wind speed of the location of the plurality of wind turbines will be between 7 to about 15 m/s at the elevation of the wind turbine hub. In some embodiments, the annual average wind speed of the location of the plurality of wind turbines will be between 9 to about 30 m/s at the elevation of the wind turbine hub.

According to some embodiments, each of the plurality of wind turbines may be optimally spaced apart for the efficient utilization of wind energy. In some embodiments, the spacing may depend on a variety of factors, such as those described above, including the blade diameter of each wind turbine, the area of land in which the wind turbine is located, and the approximate location of other wind turbines, surface conditions of the land, angle of the wind, wind turbulence, wind gusts wind variations. Placement of the wind turbines may vary, but it has been found to be optimum at lengths of between about 1.5 to 3 times the diameters of the blades from side to side and at lengths of between about 7 to 13 times the diameter of the blades downwind from the other.

In some embodiments, a plurality of 2.5 MW wind turbines may be used. A suitable example of a wind turbine that may be used according to some embodiments is the GE Energy 2.5 MW Wind Turbine. Such wind turbines have variable hub heights, rotor diameters, speed control, and blade pitch. However, it is within the scope of the various embodiments to include variations of output and other design features in the wind turbine.

Current blade diameters for the General Electric 1.5 MW wind turbines are 254 feet, the 2.5 MW wind turbines are 330 feet and the 3.6 MW wind turbines are 345 feet. The tower and/or hub height for the machines varies depending upon need but typically are in the following ranges: 1.5 MW hubs are between about 165 feet to about 350 feet high and the 2.5 MW hubs are between about 200 to about 450 feet high. In some embodiments, the blade diameter of each wind turbine is between about 320 to about 380 feet. In some embodiments, the blade diameter of each wind turbine is between about 330 to about 360 feet. In some embodiments, the blade diameter of each wind turbine is between about 345 feet and 500 feet.

The output of a wind turbine depends on a number of factors, including the turbine's size and design, the speed of wind passing through the rotor, and the amount of time each day that wind is available and the number of days per year that the wind is available. The energy that wind contains is a function of the speed of the wind or the kinetic energy of the wind. For example, a wind turbine at a site with a 10 meter per second wind speed can generate 70% more energy than a wind turbine at a site with an 8 meter per second wind speed.

Advantageously, the average output of the wind turbines described herein ranges from about 40% to about 100% of the rated labeled output of the wind turbines. In some embodiments, the average output of the wind turbines ranges from about 50% to about 100% of the rated labeled output of the wind turbines. In some embodiments, the average output of the wind turbines ranges from about 60% to about 100% of the rated labeled output of the wind turbines. In some embodiments, the average output of the wind turbines ranges from about 70% to about 100% of the rated labeled output of the wind turbines. The average power output of embodiments described herein can be effectuated by placement of the wind turbines in a location having good wind speeds, such as between about 10 and about 30 m/s, or between about 12 and about 30 m/s, or between about 14 and about 35 m/s, or even higher values in certain locations. As such, the wind farms may be made to be economically feasible. Moreover, wind farms described herein are configured to be grid-independent wind farms. Grid-dependent wind farms may require aerial power transmission lines which could be negatively affected by such high winds. It should be noted that previous grid-dependent wind farms have been located in areas in which the average output has ranged between 25% and 36% average output capacity, based on the rated labeled output capacity of the wind turbines.

Figure 3:
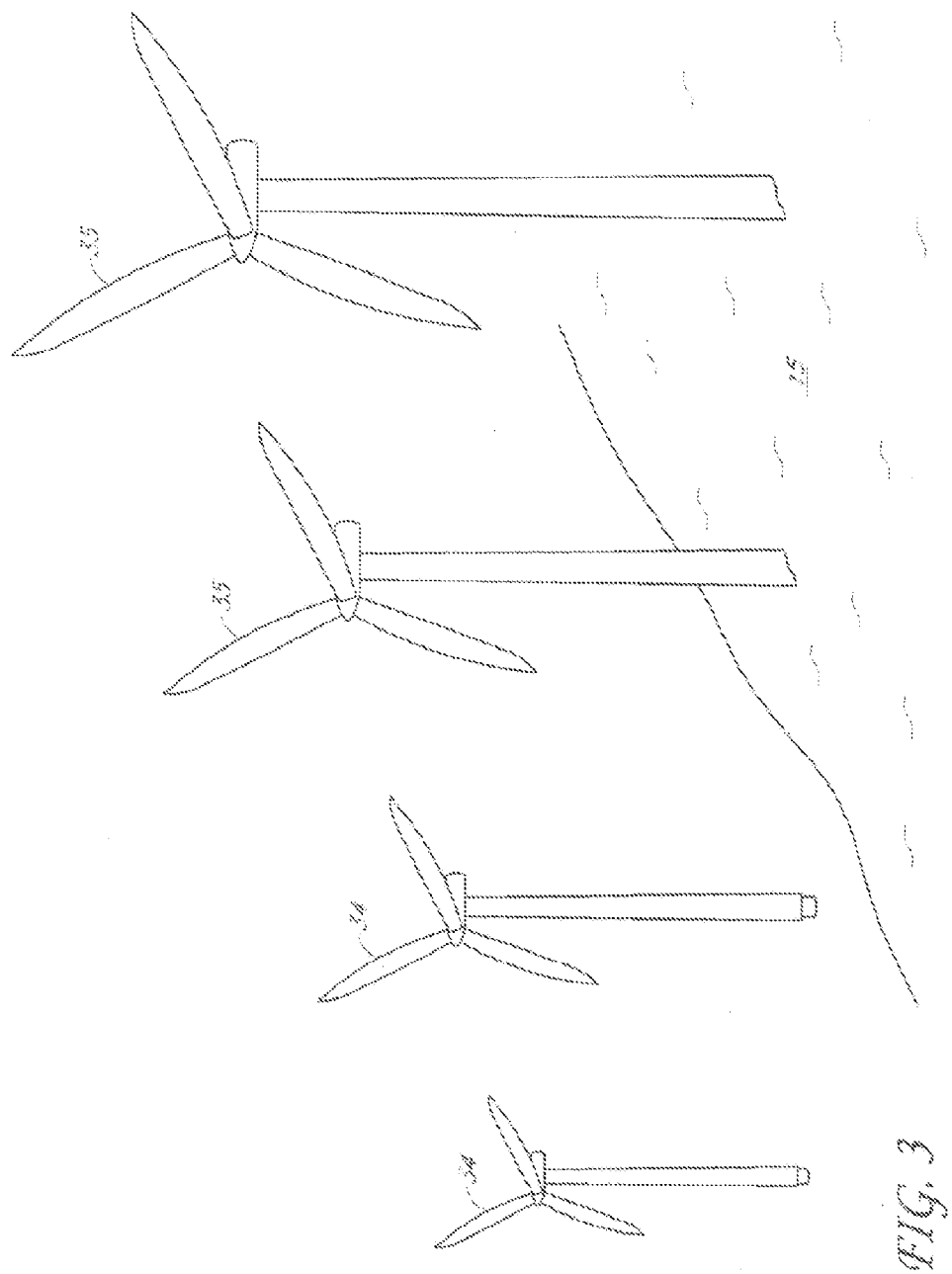
FIG. 3 is an illustration of land-based and off-shore wind turbines.

Referring to FIG. 3, land based wind turbines 34 and off shore wind turbines 35 are shown. In some embodiments, a wind farm of the hydrogen production facility may include both land based wind turbines 34 and off-shore wind turbines 35. As electricity produced by the wind turbines must be transferred to the power distribution system, the wind turbines are preferably located within transmittable distance of the power distribution facility. In some embodiments, off-shore wind turbines are located within 2000 meters of the coast.

In one nonlimiting example, a plurality of wind turbines is located on Santa Rosa Island. Santa Rosa Islands is an island in the Channel Islands National Park located of the coast of Southern California. Each wind turbine is a GE 2.5 MW Wind Turbine having a blade diameter of 330 feet. The wind turbines are spaced side to side at two times the blade length at 660 feet, and down stream of each other at 3300 feet. Wind turbines are located across the entire 53,195 acres of the island such that the average area of the wind turbine is 100 acres, thus allowing for 550 turbines to be located on the island. Another 136 wind turbines are located in coastal water surrounding the island. Santa Rosa Island encounters an average wind speed of 7.75 meters per second. Each turbine has an output of 7.5 million KWh per turbine, for a total output of 4.7 billion KWh per year.

B. Power Distribution Systems & Shipping Based Thereon

In some embodiments, the power distribution system comprises a controller. The controller commands and controls the power generated by the plurality of wind turbines and allocates the power to one or more elements of the system. The controller may be programmed to output certain amounts, types, and frequencies of power depending on one or more input variables and output variables.

Input variables include, but are not limited to, the instantaneous wind speed, wind direction at the location of the wind turbines, various size and output parameters of the wind turbines, generator type, efficiency of the wind turbine and other such variables that affect power output from the wind turbines. In addition, input variables may include types and sizes of electrical lines transporting the power from the wind turbines to the power distribution and control system.

Output variables include, but are not limited to, one or more of the type, the phase, the frequency, and the voltage of power required to operate one or more components of the hydrogen generation facility. To accommodate one or more output variables, the power distribution control system may be equipped with one or more of converters, frequency converters, power regulators, transformers, switches, diodes, resistors, vacuum tubes, capacitors, coils, potentiostats, or the like.

In some embodiments, the power distribution system may also include energy storage units. Such energy storage units may be used to store energy such as the electric power generated by the wind turbines. In some embodiments, the energy storage units comprise a hydrogen storage unit for storing an amount of hydrogen produced by the one or more electrolyzer units. Such storage units may be used to replenish a stored amount of energy from the renewable energy resources such that the system and methods may be operated in a continuous and self sustaining capacity.

The power distribution system may distribute power generated from the wind turbines to one or more of the other systems modules, such as the electrolyzer module, the desalination module, or the storage module. Moreover, the power distribution system may allocate power to the control systems of the wind turbines themselves, although the power necessary to control the wind turbines may also be produced from the wind turbines themselves or other energy means located on the wind turbines, such as solar energy panels or batteries.

Power output of the wind turbines is greatly influenced by wind conditions on individual wind turbine generators. The inherent inertia of individual wind turbines and the varied operating conditions of wind turbines across a large wind farm may contribute, to an extent, to smoothing of some variation in power output of the wind farm. However, given the changeable nature of winds, it is possible that the collective output of a wind farm can vary from relatively low output levels to full power, and vice versa, in relatively short periods of time. Because electrical power is not stored on the power generation system except as hydrogen itself, a balance between electricity generated and electricity consumed must be achieved.

Power fluctuation of wind turbines due to gusty or low wind conditions is usually dealt with by adjusting power output of other power generation sources to provide a relatively constant overall power level which matches the demands of the grid system. However, certain embodiments of the hydrogen production facilities as described herein are grid-independent and therefore power variations are not a concern or problem.

In order to compensate for these power fluctuations of the plurality of wind turbines, the power distribution system can affect electric consumption changes in one or more components of the hydrogen production facility. If and when electrical power production is below a target level, the power distribution system may cut power to one or more systems of the facility. In particular embodiments, the power distribution system may decrease power to systems in the following order: (1) systems such as the transfer pumps, desalination, and electrolysis systems only as required; (2) hydrogen storage and refrigeration; (3) system controls, monitors and sensors. However, it is preferable that the system controls, monitors, and sensors never go without power. Therefore, a generator may be used for the system controls, monitors, and sensors. In some embodiments, hydrogen production is dependent upon water and electricity. In some embodiments, the volume of water consumed to produce hydrogen must be substantially equivalent to the volume of water processed by the desalination systems. Further, the hydrogen purification and pumping systems must operate to handle the hydrogen produced.

While pumps may be cycled on and off in certain embodiments, it is preferred that cycling pumps on and off is an inefficient process. Moreover, utilizing back-up systems may also be inefficient. As such, some embodiments include a continuous production methodology to avoid such inefficiencies.

Figure 4:
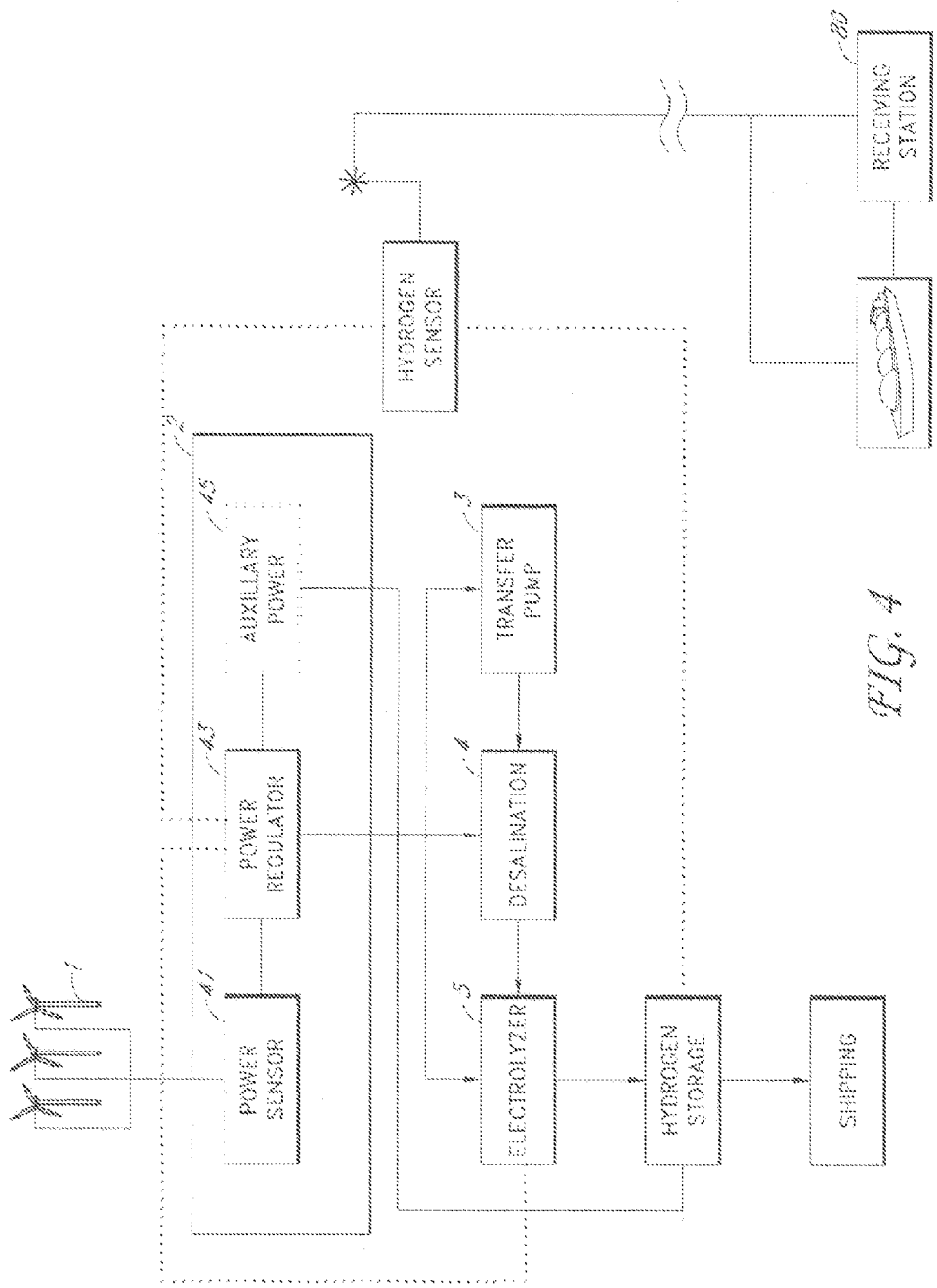
FIG. 4 is a schematic drawing of the hydrogen production facility and various components of the power distribution system.

Referring to FIG. 4, a wind farm 1 transmits electricity to the power distribution system 2. The power distribution system 2 includes a power sensor 41, a power regulator 43, and auxiliary power unit 45. Power sensor 41 may monitor the total power output of the wind farm 1. By comparing the total power output to a target power output, the power sensor 41 may signal the power regulator 43 to adjust power to one or more components of the system including the electrolyzer system 5, the desalination system 4, or the salt water transfer pump 3. The power regulator may also be operationally connected to other components such as the compressor, transfer pumps, a wind farm maintenance station, and other various infrastructures that support the hydrogen production facility.

When the total power output is greater than the target power output, the power regulator can increase rate of production of hydrogen. To do so, the power regulator 43 can increase electricity flow to the one or more components selected from the electrolyzer system 5, the desalination system 4, or the salt water transfer pump 3. In some embodiments, a increase of electrical power to all of these components results in an increased production rate of hydrogen. In certain embodiments, the power regulator 43 may increase electrical flow to these systems in discrete amounts.

When the total power output is less than the target power output, the power regulator can decrease rate of production of hydrogen. To do so, the power regulator 43 can decrease electricity flow one of the systems noted above. In some embodiments, the power regulator decreases power to the electrolyzer system 5, the desalination system 4, or the salt water transfer pump 3. In preferred embodiments, the clean output of the one or more desalination units is equivalent to the water consumption of the electrolyzer system. In some embodiments, a decrease of electrical power to all of these components results in a decreased production rate of hydrogen. In certain embodiments, the power regulator 43 may decrease electrical flow to these systems in discrete amounts.

As discussed below, the electrolyzer system may include two or more electrolyzer units. Likewise, the desalination system may include two or more desalination units, and the salt water transfer pump system may include two or more transfer pumps. With increased numbers of these units, hydrogen production can be increased. It is also contemplated that each individual unit may be regulated so that hydrogen production is increased or decreased by increasing or decreasing the flow of electricity to the individual unit.

Figure 5:
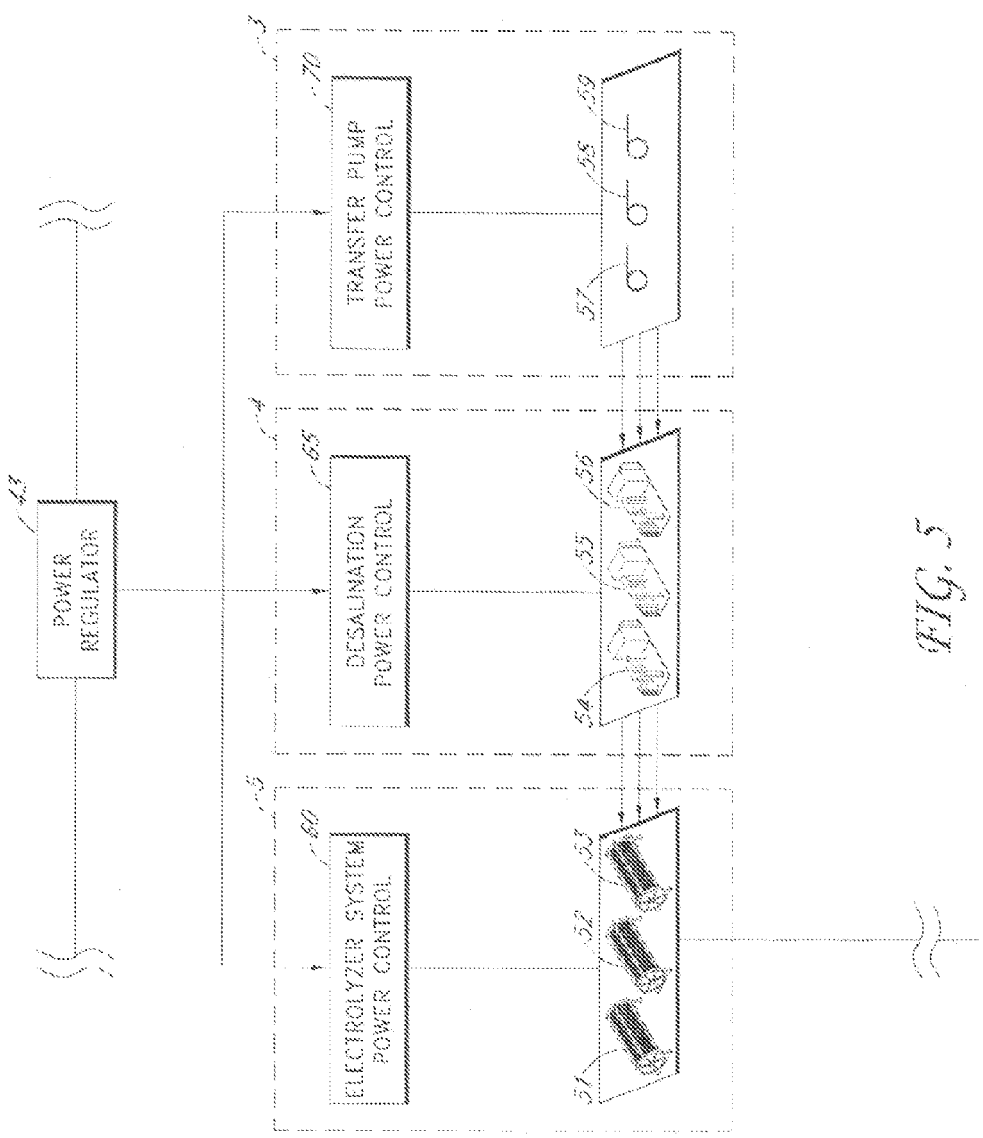
FIG. 5 is a schematic drawing of the power regulator in communication with the electrolyzer, desalination, and salt water transfer pump systems.

In certain embodiments, the component system operationally connected to the power regulator 43 include banks of individual electrolyzer units 51,52,53, desalination units 54,55,56 or transfer salt water transfer pumps 57,58,59. As shown in FIG. 5, the electrolyzer system 5 includes an electrolyzer system power control 60 and a plurality of electrolyzer units 51,52,53. The desalination system includes a desalination power control 65 and a plurality of desalination units 54,55,56. The salt water transfer pump system includes a transfer pump power control 70 and transfer pumps 57, 58,59. Power regulator supplies electricity to one or more of the electrolyzer units 5, desalination system 4, and salt water transfer pump system 3. The power controls 60,65,70 of each individual system may modify the electricity flowing to each individual component. In some embodiments, the power controls 60,65,70 may function to activate or deactivate one or more of the individual units. For example, when the target power output level is exceeded by the actual total output level, the power regulator can communicate with one or more other power regulators 60,65,70 to activate individual units of the electrolyzer system 5, the desalination system 4, or the salt water transfer pump system 3. In some embodiments, activation of additional units results in increased water flow rates from the transfer pump system to the desalination system and to the electrolyzer system. Thus, hydrogen may be produced at a greater rate when output power is greater than the target power.

As is further illustrated in FIG. 4, power regulator 43 may be in communication with a hydrogen sensor in the electrolyzer system 5. Power regulator 43 may monitor the rate of hydrogen production through such sensor. In certain embodiments, power regulator 43 may operate to send a signal to a receiving station 80 or a hydrogen ship located at the receiving station 80 or a hydrogen ship in transit. Upon receiving the signal, the hydrogen ship or the receiving station 80 may process the signal and prepare to receive hydrogen from the hydrogen production facility.

In one embodiment, a method for controlling variability in power output of a grid independent hydrogen producing wind farm includes monitoring a power output level of the hydrogen producing wind farm, comparing the monitored power output level of the wind farm to a target power output level, the target output level being correlated to a targeted production rate of hydrogen, commanding a change in electrical power in one or more elements of the hydrogen producing wind farm facility, the one or more elements being selected from an electrolyzer system electrically coupled to the wind farm, a desalination system electrically coupled to a wind farm, or a diesel generator (used to maintain power to critical monitoring and control systems) electrically coupled to the wind farm, wherein the step of commanding a change maintains a net power output level by the wind farm based upon the comparison and monitoring the targeted production rate of hydrogen and comparing the rate of change in hydrogen production to a targeted rate of change of power output.

Advantageously, efficiencies of shipping hydrogen may be maximized by utilizing such a power distribution control system 2. In one embodiment, a target output capacity of power (and thus of hydrogen) is correlated with one or more variables including the number of ships transporting hydrogen, the size of the ships, the amount of container units on the ship, the capacity of the ship (sometimes measured in Twenty Foot Equivalent units if it is a container ship), speed of each hydrogen transport ship, direction of the hydrogen transport ship, course of the hydrogen transport ship, and the schedule of the hydrogen transport ship.

In one embodiment, the total output capacity may be greater than the target output capacity over a given time period. As such, it may be more efficient to send more ships or ships having greater capacity to the hydrogen production facility so that the increased amount of hydrogen may be accommodated. Conversely, when the total output capacity is less than the target capacity (and the output results in reduced hydrogen production), then less ships or ships having a smaller capacity may accommodate the amount of hydrogen production.

C. Desalination Systems

In certain embodiments, the hydrogen production facility is located adjacent to a body of water. Advantageously, the location provides access to this natural resource. In certain embodiments, the facility located adjacent to a body of salt or seawater. In such cases, desalination systems may be used for removing most of the dissolved solids from seawater and from other sources of water, which are ultimately split into hydrogen and oxygen. According to various embodiments, the desalination system receives water from the adjacent water source. In some embodiments, the sediment is first removed from the water and then the water is processed through reverse osmosis filters and purified to have less than about 200 ppm of total dissolved solids, and preferably less than 5 ppm of total dissolved solids.

Figure 6:
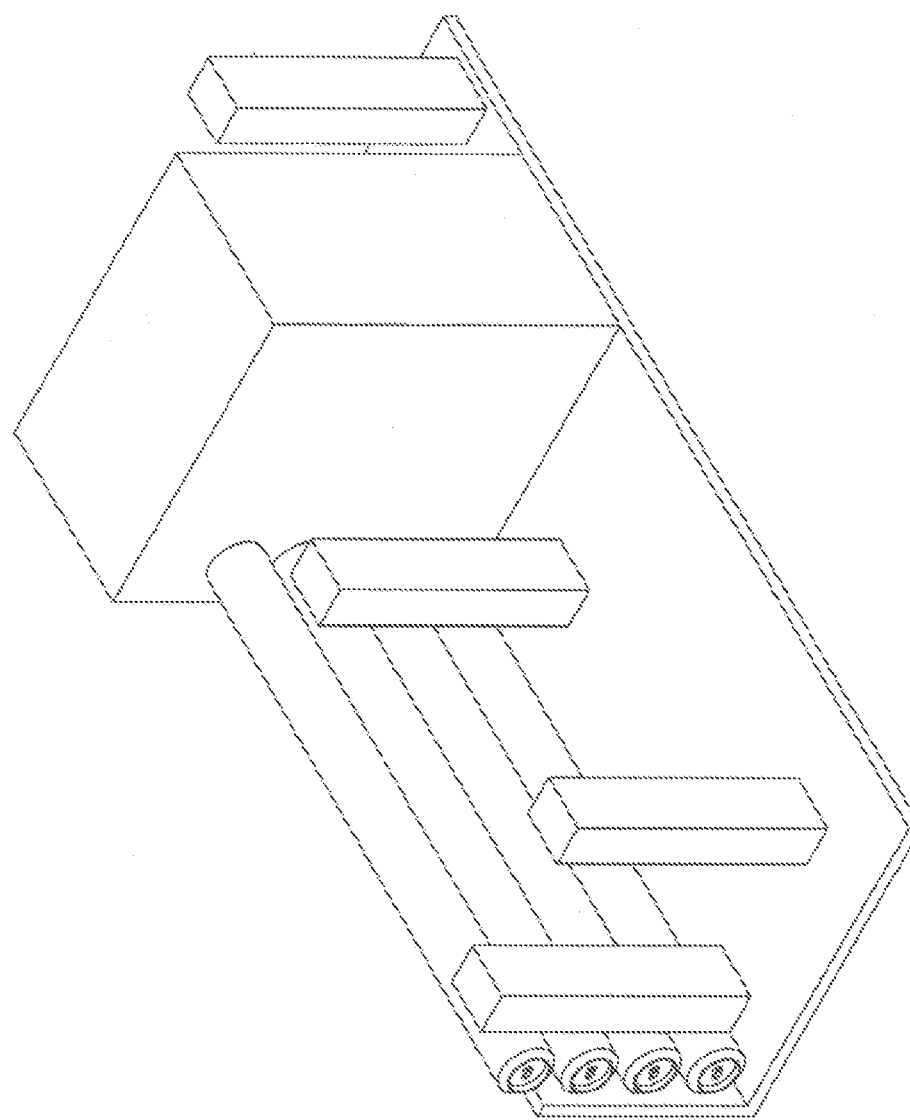
FIG. 6 is one embodiment of a desalination system.

Desalination units are well known to those having ordinary skill in the art. Referring to FIG. 6, a typical example of a desalination train is shown. In accordance with certain embodiments, the desalination system may include one or more reverse osmosis devices or other devices capable of removing the dissolved solids from the water. In accordance with systems described herein, the desalination unit receives electrical energy from the power distribution control system and operates exclusively from such electrical energy. In some embodiments, the rejected water will be returned to the original source.

Example of suitable desalination units includes those sold by Global Enviroscience Technologies, Inc. (Long Beach, Calif.). In certain embodiments, the units may be operated off of a designated voltage or frequency, such as 120V 60 Hz, 220V 60 Hz, 440V 60 Hz or European frequencies of 50 Hz. Such desalinations units are referred to as trains and these trains may be extended if more volume of water is necessary to purify, or more than one unit may be utilized.

D. Electrolyzer

Figure 7:
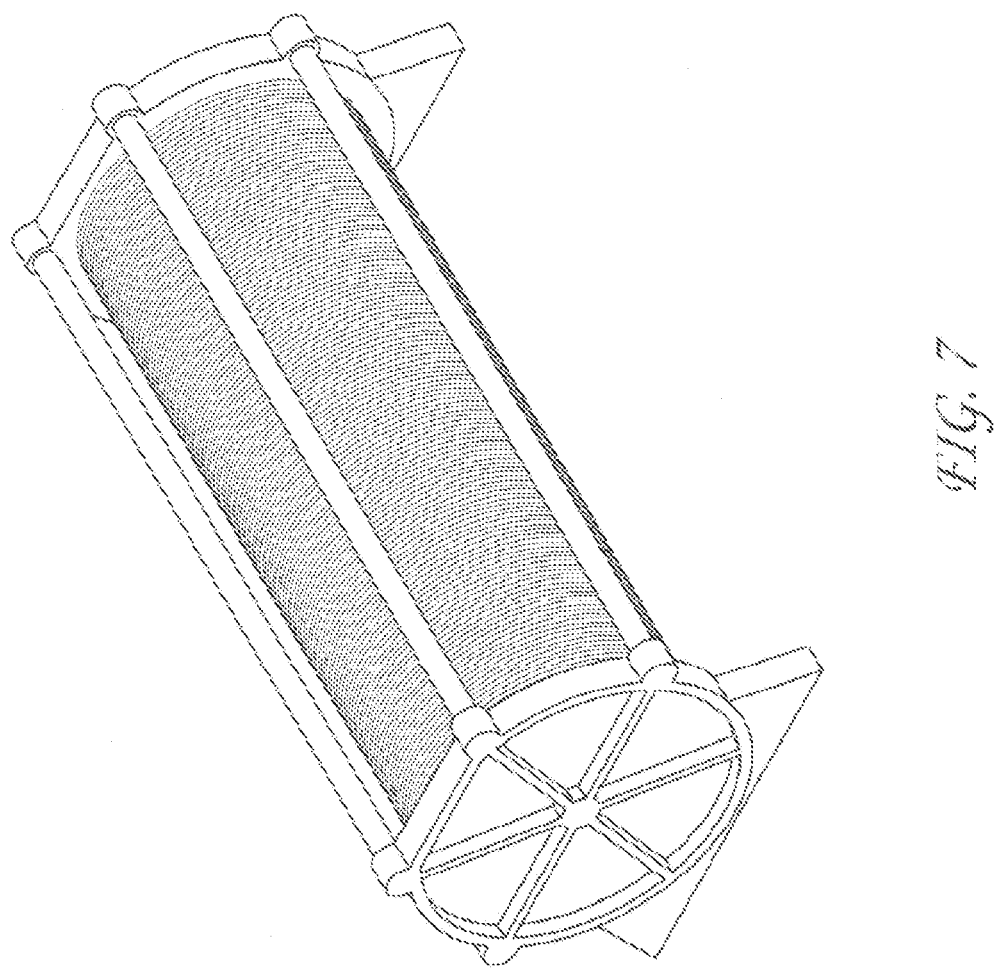
FIG. 7 is one embodiment of an electrolyzer unit.

As noted above in the Background section, electrolysis of water results in the conversion of water into its elemental components: hydrogen and oxygen. While electrolysis can be accomplished in various devices, in certain embodiments, a plurality of electrolytic cells or electrolyzers are used to convert the electrical energy and the water into hydrogen. Such electrolyzers may be located at the facility for converting the water into hydrogen using the electrical energy. Referring to FIG. 7, a typical electrolyzer unit is shown. In some embodiments, each of the plurality of electrolytic cells receives water from the desalination unit (or other source as desalination in optional) and generates between about 200 to about 700 Nm$^3$/hour of hydrogen by utilizing the electrical power allocated by the power distribution control system.

In some embodiments, each electrolytic cell utilizes an amount of electrical energy between about 3 to about 6 kWh of electrical energy to produce 1 Nm$^3$ of hydrogen. In some embodiments, the total capacity of the plurality of electrolyzers may be determined by the number of electrolyzers employed. In another embodiment, one or more of the electrolyzers may be configured to have a higher output based on the size, energy, and the amount of water that is processed.

Example of preferred electrolyzers include the Norsk Hydro's Atmospheric Electrolyzers having an output ranging from 60 Nm$^3$/h-485 Nm$^3$/h, including Type No. 5040. Such electrolyzers receive DC power. For example, the Norsk Hydro's Atmospheric Electrolyzer Type No 5040 may have a maximum DC Power Rating of 5150 Amp DC. The amount of hydrogen production may vary depending on the power.

Preferred electrolyzers may use various catalysts and electrolytes to assist in the production of hydrogen. In some embodiments, the purified or fresh water received by the electrolyzers is mixed with an electrolyte to form approximate 15 to about 35% aqueous solution. In some embodiment, the water is mixed with KOH to form a solution having a concentration of about 20 to about 30% by weight of KOH.

In certain embodiments, an electrolyzer system may include two or more electrolyzer units. In certain embodiments, an electrolyzer system may include 500 or more electrolyzer units. In any of the described embodiments, the electrolyzer units may be mounted on skids or metal rails. In certain embodiments, the skids enable a user to move the electrolyzers as necessary, by using a forklift or other such device. The two or more electrolyzers may be connected to central manifolds by means of bolted flanges. The manifolds, one to supply water and one to remove produced hydrogen will have flexible connections to facilitate the simple addition and removal of the electrolyzers units. For example, a flexible bellows line could be used. The electrolyzer units or the manifolds may include valves to selectively close and/or disconnect the electrolyzer units from the manifolds for maintenance. Likewise, electrical cut off switches may allow one or more of the electrolyzer units to be selectively used to generate hydrogen. For example, if power output generated by the wind farm is greater than a target power output level, an electrolyzer unit may be selectively used by closing the electrical switch which allows the flow of electrical power to the electrolyzer unit. Thus, the electrolyzer units are modular in design.

II. Hydrogen Storage and Shipping

A. Liquid or Gaseous Hydrogen Storage

According to various embodiments, the hydrogen is stored on-site at the hydrogen production facility prior to shipping or distribution. However, the hydrogen may also be transported off-site and stored at another location. Storage of hydrogen can occur at reduced temperatures and increased pressure such that hydrogen is in a partially liquid state, liquid state and/or a gaseous state. Hydrogen has a very high vapor pressure, low ignition energy, and wide flammability-explosion limits, leading to certain handling requirements. As with other liquid fuels, such as liquid natural gas, hydrogen may be removed from the storage facility and shipped. Various modalities of storing hydrogen include, but are not limited to, one or more of the following: metal hydride tanks, compressed hydrogen, cooled hydrogen, chemically stored hydrogen including carbon nanotubes which store hydrogen.

Hydrogen may be stored and/or transported in gaseous form (compressed), or liquid form (in insulated tanks), depending on the pressure and temperature of the hydrogen gas. As is understood by persons having ordinary skill in the art, the phase of hydrogen may be controlled by varying the pressure, temperature, and volume of hydrogen gas. The physical properties of the gas may vary in accordance with principles understood by persons having ordinary skill in the art.

In some embodiments, it is desirable to compress hydrogen into high-pressure tanks. Such compression may occur upon production of the hydrogen at the electrolyzer unit. A compressor may be used to compress the gas into the high-pressure tanks. In some embodiments, a single or multi-stage compressor is used to compress the hydrogen. In certain embodiments, compressed gas tubes can be used to store the hydrogen.

In another embodiment, hydrogen is stored as a liquid at reduced temperatures. Such reduced temperatures are about 15 to about 20 Kelvin at atmospheric pressure, or may vary with increased pressures. For example, hydrogen may be stored at temperatures less than room temperature and pressures greater than atmospheric pressure. Under certain conditions, hydrogen may exist as a gas or liquid depending on the exact conditions under which hydrogen is stored.

B. Storage Tanks

As hydrogen has a high vapor pressure, specialized containers are necessary for the storage of hydrogen. In some embodiments, hydrogen storage tanks are insulated to preserve temperature, and are reinforced to store the liquid hydrogen under pressure. For example, insulated and fiber-reinforced compressed hydrogen gas tanks may be used. In some embodiments, cryo-compressed containers may be used.

One non-limiting example of a suitable container is a container having a spherical or prismatic shape such as those present on a liquefied natural gas ship. In another embodiment, the Moss-type aluminum spherical storage tanks may be used. Such storage tanks may be self-supporting. Another non-limiting example includes a self-supporting tank such as those used by Ishikawajima-Harima Heavy Industries.

Figure 8:
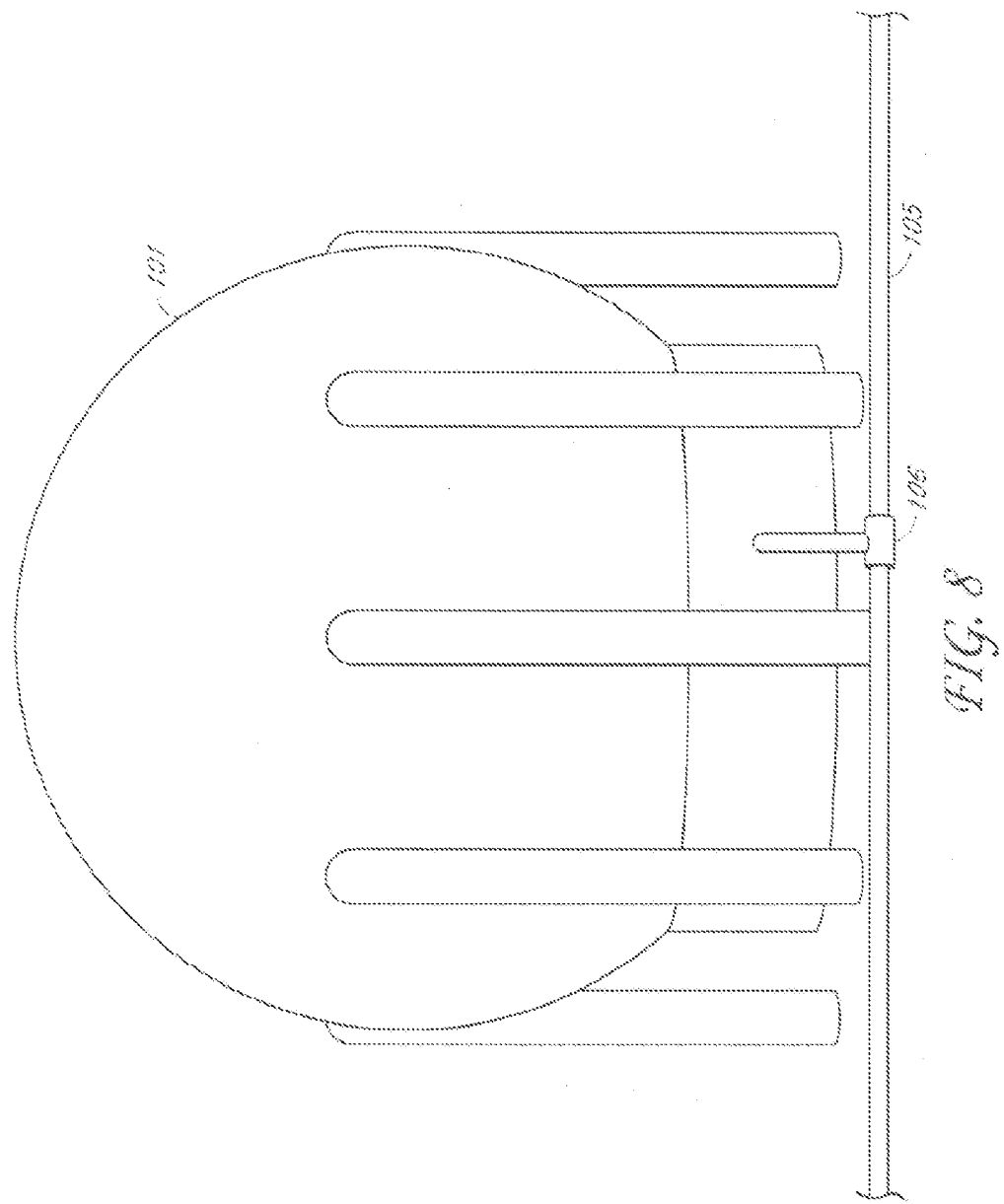
FIG. 8 is one embodiment of a hydrogen storage module.

Referring to FIG. 8, a spherical type container 101 may be used to store the hydrogen. As shown, the spherical type container 101 is in liquid communication with hydrogen through pipe 105 and conduit 106. Conduit 106 may be equipped with a valve for closing or opening the conduit 106 as needed. One or more other spherical containers 101 may also be present on the pipe 105. In certain embodiments, hydrogen may be transferred away from the container 101. In some embodiments, hydrogen is transferred away from container 101 to a shipping container either located on a ship or a container that may be loaded onto a ship. It certain embodiments, container 101 may be transported to a ship for further shipping of the hydrogen.

Transfer of hydrogen from the original container to another container could result in inefficiencies of the transfer process because of the cooling and warming of the hydrogen upon transfer and the loss of hydrogen during the process. Thus, it is desirable in some embodiments to use the hydrogen storage tank located at the hydrogen production facility as the shipping vessel. Advantageously, this allows the previously stored hydrogen, either compressed or cooled, to remain in the hydrogen tank without experiencing changes in temperature or pressure.

Figure 9:
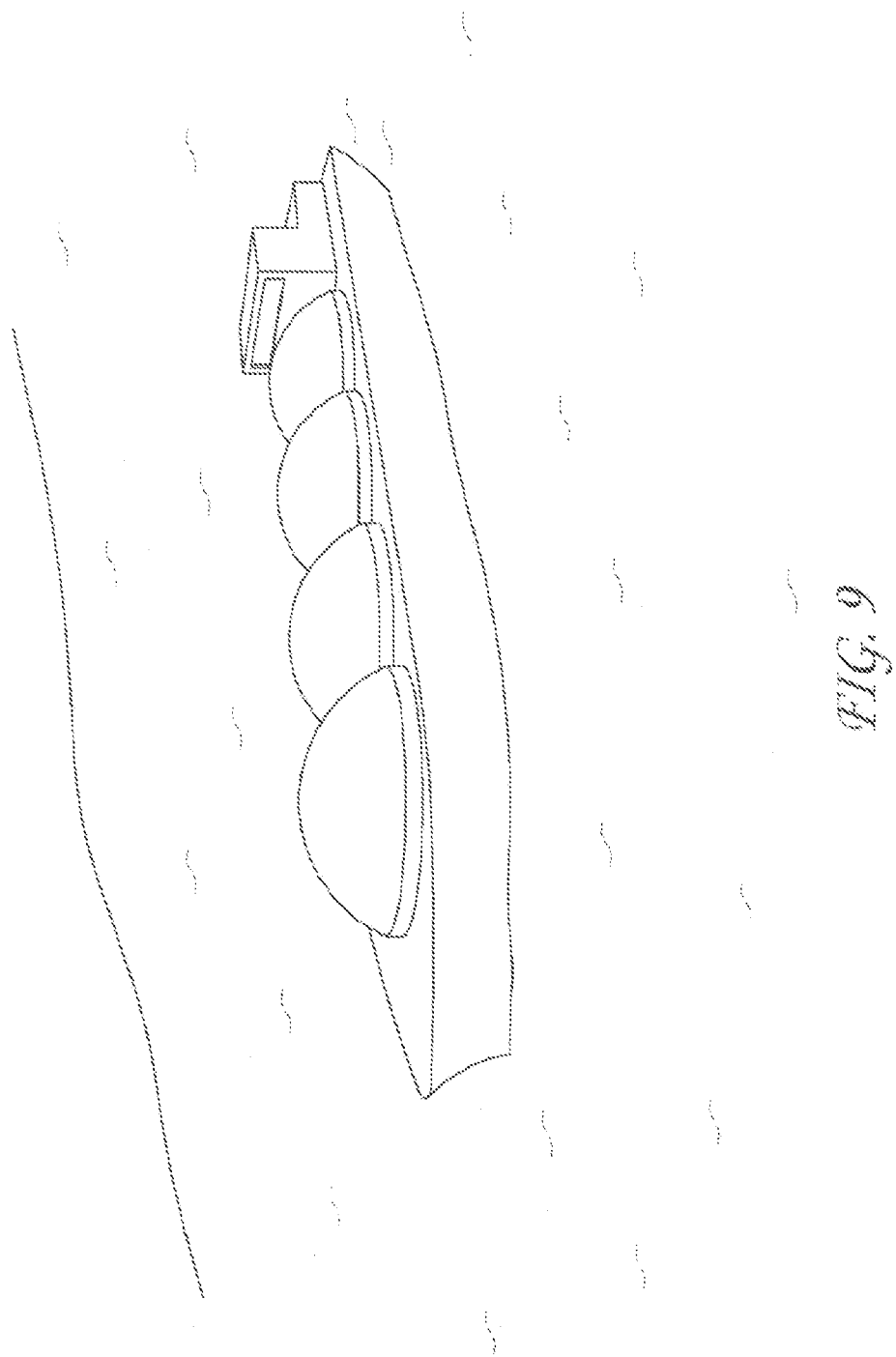
FIG. 9 is one embodiment of a ship having a hydrogen storage module that receives hydrogen for transport.

In another embodiment, an insulated membrane supported by the ship's hull may be used. In certain embodiments, the ship may contain one or more shipping membranes. As illustrated in FIG. 9, the ship is equipped with multiple storage membranes. Such membranes may be supported by the ship's hull. One example of such a suitable membrane is the Technigaz and Gaz Transport which is a transport type member. Typically, these membranes consist of stainless steel with 'waffles' to absorb the thermal contraction when the tank is cooled down. As suggested above, such membranes may need to be fiber reinforced, or are contained in ships with fiber reinforced hulls. Moreover, such membranes may contain primary and secondary membranes. Such membranes may also be made of materials that incur very little thermal contraction such as invar.

Such membrane storage systems may be filled by introducing liquefied hydrogen to the ship via a port and pipeline. One nonlimiting example of a hydrogen pipeline would be the type used by Air Liquide in Europe and Praxair's 300 mile Gulf-Coast hydrogen pipeline. Approximately 1650 miles of hydrogen pipeline exist in the United States and Europe. Generally, these pipelines have a diameter ranging from about 6 to about 40 inches. A ship comprising a hydrogen storage membrane may connect with the hydrogen pipeline, and thus receive hydrogen from hydrogen production facility.

Since a lengthy pipeline would require high pressures or low temperatures, it is desirable to have a short pipeline to deliver the hydrogen from the storage modules to the shipping containers.

When ports and docks are not available a large bulk container ship can load and later unload hydrogen by means of mooring buoys and flexible transfer lines. An example of where this method would be of particular benefit is when transferring hydrogen to receiving facilities along the coast line. This technique may be particularly suitable where deep water ports are not available but the proximity of the receiving station to the ocean would allow a ship to come close and off load hydrogen.

In some embodiments, container ships may be used to transport hydrogen. Container ships are designed in such a manner that no space is wasted. Their capacity is measured in TEUs (Twenty-foot Equivalent Units), the number of 20-foot containers a vessel can carry, even though the majority of containers used today are 40 feet (12 m) in length. Container ships may have a capacity ranging from about 10 and about 15000 Twenty Foot Equivalent Units. Above a certain size, container ships do not carry their own loading gear, so loading and unloading can only be done at ports with the necessary cranes. However, smaller ships with capacities up to 2,900 TEUs are often equipped with their own cranes.

Figure 10:
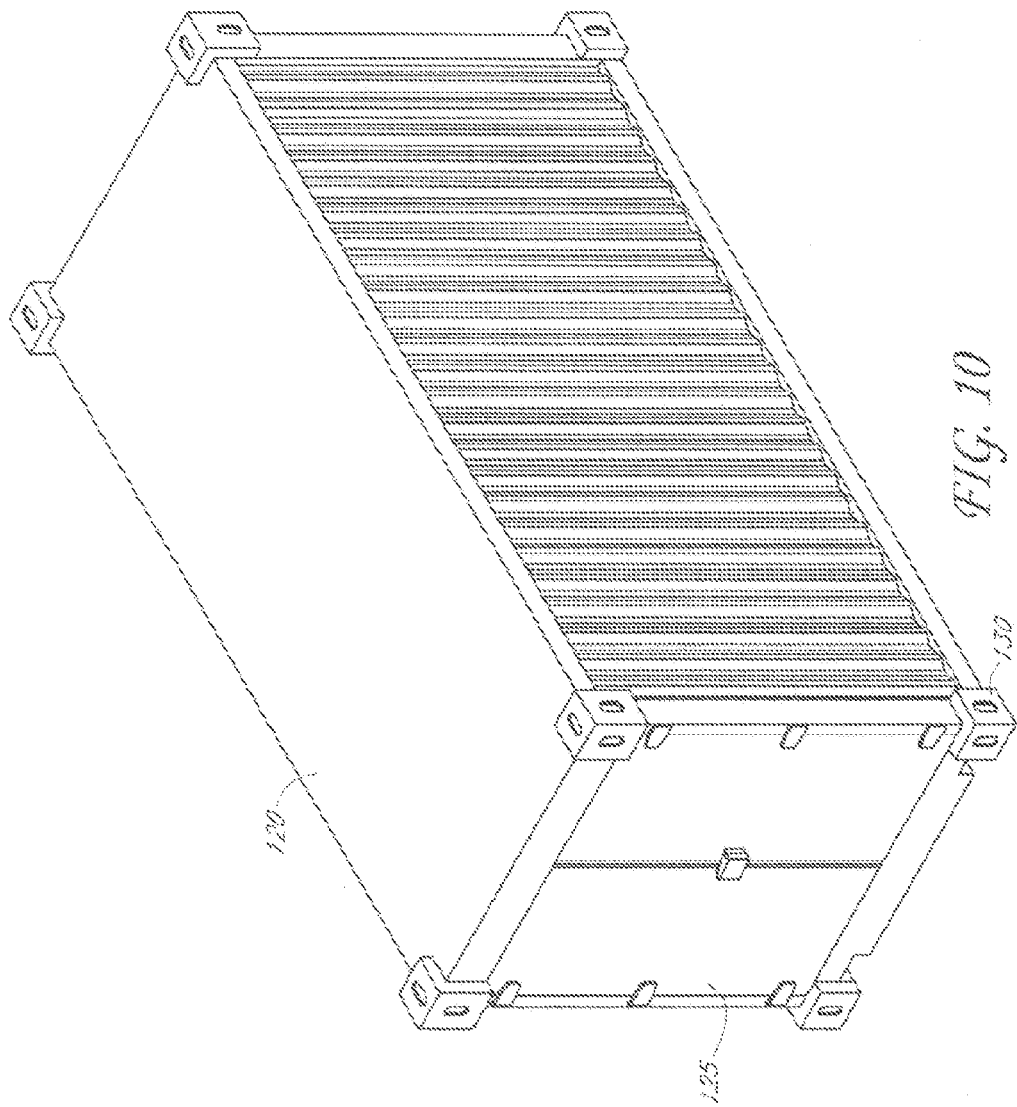
FIG. 10 is a drawing of a shipping container.

Referring to FIG. 10, a standardized container 120 having corner fittings 130 and optional doors 125. One example of a standardized container is an ABS standardized container. The ABS regulates container dimensions and makes them standardized. As these containers have similar dimensions resulting in alignment of one or more corner fittings, the containers are stackable and transportable, whether on ship or land. A typical container may have 8×8×20 foot dimensions. In some embodiments, containers may have 8×8×40 foot dimensions. Some containers have 8×8×48 foot dimensions. While containers have been described in terms of standardized containers having certain dimensions, it is contemplated that any size container may be adapted for the same principles of stacking and ease of transportation as described herein. As such, the containers may also have a variety of dimensions depending on the exact application.

Within such containers may be hydrogen shipping containers. One particularly suited container is the hydrogen storage container 150 shown in FIG. 12. In some embodiments, container 150 is a vacuum insulated tank. In some embodiments, container 150 is configured to maintain a cryogenic temperature. Container 150 may be equipped with various elements that are known for use in hydrogen tanks. For example, container 150 may include support structures or baffled plates, and it may be divided into inner and outer tanks or into multiple tank sections. Baffled plates may be incorporated to minimize the vibration of liquid hydrogen during transport.

Referring to FIG. 11, storage tank 151 may be equipped with a plurality of saddle legs 152. The saddle legs 152 may be configured to conform to the corner fittings 130 of so-called ABS standardized shipping containers. In certain embodiments, distance X is about 8 feet to match the standardized containers described above. In some embodiments, the tank's diameter is a distance between about 8 feet to about 12 feet. Distance Y may vary, but may be 9, 19 or 40, or other distances depending on the container size. In certain embodiments, distance Y matches the ABS corner distances of standardized shipping containers. In certain embodiments, saddle legs 152 may include shock absorbers to minimize movement of hydrogen within storage tank 151. In some embodiments, the storage tanks may contain up to about 20 kL of liquid hydrogen. In certain embodiments, the storage tank may container up to about 40 kL of liquid hydrogen.

Figure 12:
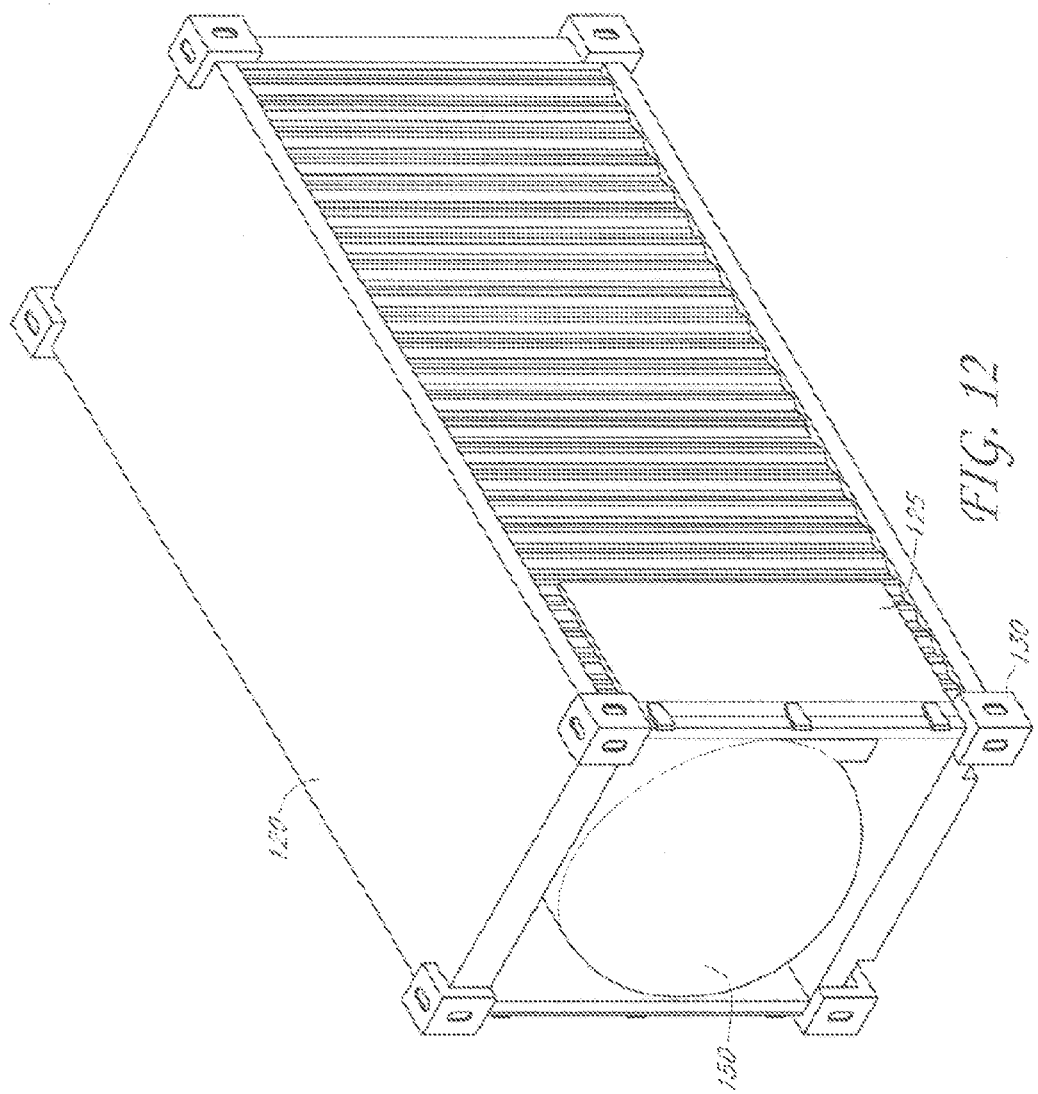
FIG. 12 illustrates the hydrogen storage and transport tank disposed within the shipping container.
Figure 14:
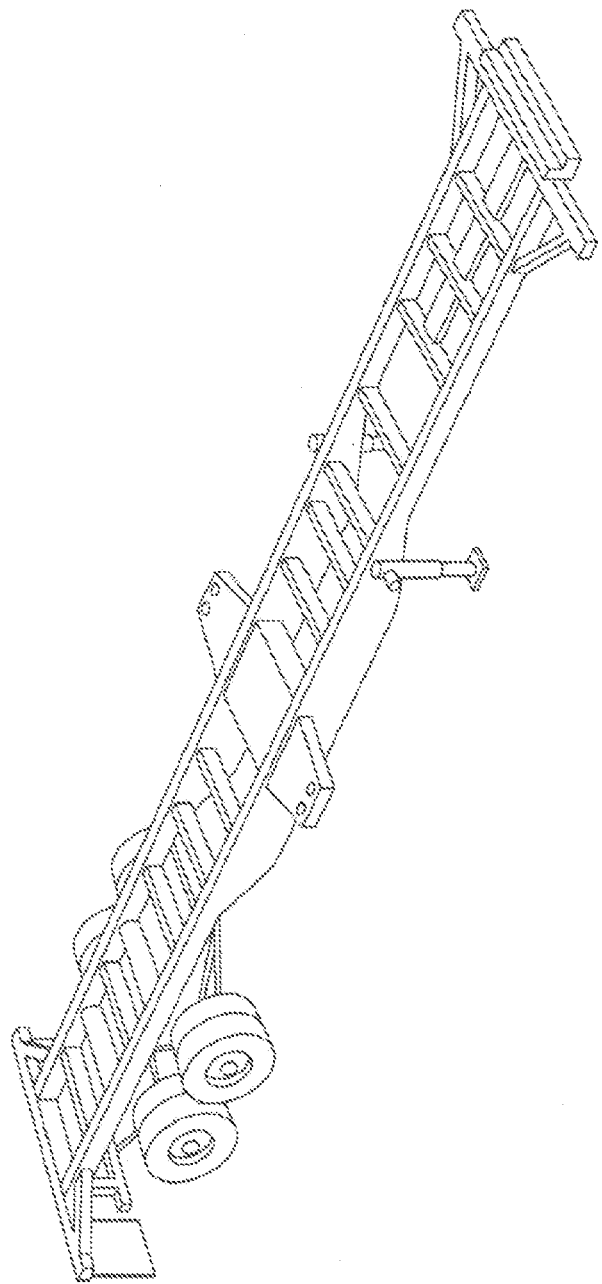
FIG. 14 illustrates a standard trailer for shipping the hydrogen tank shipping containers on trucks or other automobiles

Referring to FIG. 12, hydrogen storage tank 150 may be stored within container 120. Advantageously, such standard shipping containers including the hydrogen tanks may be shipped and transferred to trucks and/or rail cars, thus using current infrastructure in the shipping and further distribution of hydrogen from the hydrogen production facility. Standard shipping containers containing a hydrogen storage tank may then be trucked or railed after the ship delivers the container to a sea port or a hydrogen distribution facility. Such facility would typically be located in a port capable of receiving such standard shipping containers. Such containers may then be transferred to other modes of transportation such as railways or trucks, or such containers may be loaded onto barges or other ships for further delivery to a final location or another distribution center. Referring to FIG. 14, a typical trailer that may accommodate and haul a standard shipping container is shown.

In certain embodiments, hydrogen may be removed from a ship to storage tanks at the port by means of a pipeline as discussed above. Such offloaded hydrogen may then be stored and/or immediately loaded into trucks, or railway cars that have permanent hydrogen storage tanks on them. Such hydrogen storage tanks may come in various sizes including tanks ranging between about 50 to 15000 gallon sizes. In addition the hydrogen can be loaded immediately or at a later time into hydrogen tanks described herein and transported.

C. Hydrogen-Retrofit Power Generation Systems

1. Retrofitting Power Plants

In some embodiments, power plants may be converted to burn hydrogen to generate heat. Current power plants include combustion power plants such as coal, oil, natural gas, wood burning power plants, and nuclear power plants. Retrofitting of such power plants to receive hydrogen produced by a wind farm includes installation of hydrogen storage tanks and/or pipelines at the power plant facility. In particular embodiments, the hydrogen storage tanks would deliver hydrogen to a burner at the power plant.

In certain embodiments, currently existing furnaces could be replaced with hydrogen burners or hydrogen combustion burners may be installed at the power plant. In certain embodiments, it is advantageous to reuse the old housing to prevent substantial waste. In certain embodiments, the hydrogen burner may resemble a propane burner (e.g., like that on a barbeque grill). The orifices and size of the burner may be scaled depending on the need of the power plant.

In particular embodiments, the combustion system of the power plants may be replaced with a hydrogen combustion system. Such replacement may require replacement of the original turbines with installation of turbines modified to operate on hydrogen. Such turbines may be capable of generating electricity as they burn hydrogen. Advantageously, replacement of some or all of the previous power plant combustion systems would reduce or eliminate production of greenhouse gases, slow global warming, and improve the efficiency of the power plant.

In some embodiments, currently existing gas turbines which burn fuel oil and/or natural gas may be modified to combust hydrogen. To convert such gas turbines to hydrogen burning turbines, a hydrogen supply line may be used. In certain embodiments, modifications of fuel pumps, orifices, and/or the combustion chambers of the turbine may also be necessary. U.S. Pat. No. 6,021,569 and U.S. Pat. No. 6,263,568, which describe various power plant retrofittings with hydrogen-fired combustion systems are hereby incorporated by reference in their entireties.

In certain embodiments, exhaust gas from the turbines may be used to superheat water to operate a steam turbine. In some embodiments, a heat exchanger may be used. In other embodiments, the turbine exhaust is used directly to superheat water.

In some embodiments, a nuclear power plant may be configured to utilize hydrogen. Nuclear power plants generally use nuclear fuel to produce heat. The amount of heat produced is controlled by control rods in a reaction chamber. Heat generated is then used, either directly or indirectly through a heat exchanger to superheat water. Superheated water may be used to operate a steam turbine. To configure a nuclear power plant to use hydrogen, a nuclear reactor and fuel may be abandoned and replaced with hydrogen turbines as discussed above. In certain embodiments, heat from the exhaust gas from a hydrogen turbine may be used to heat water to steam and drive a steam turbine, either directly or indirectly through the use of heat exchangers. In some embodiments, nuclear power may be used in combination with hydrogen combustion.

Figure 13:
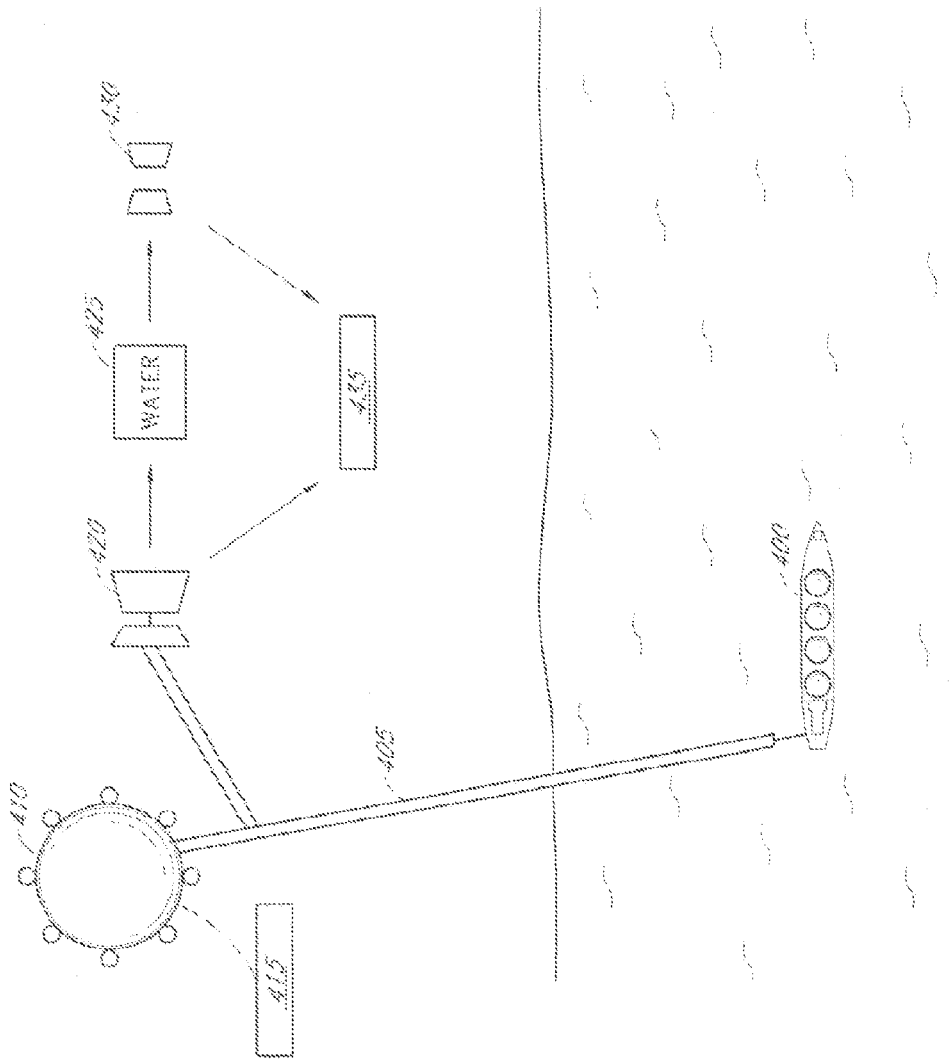
FIG. 13 is a schematic drawing of a hydrogen-retrofit power plant adjacent to a body of water.

Referring to FIG. 13, hydrogen storage tank 410 may receive hydrogen from hydrogen transportation line 405. In certain embodiments, hydrogen transportation line 405 may receive hydrogen from a shipping vessel 400. As discussed above, certain embodiments include mooring buoys and hydrogen lines which receive hydrogen from a shipping vessel 400 which is moored at the buoys. However, in some embodiments, hydrogen transportation transfer lines 405 may receive hydrogen from other hydrogen sources such as a pipeline, a truck, or a hydrogen production plant.

Continuing to refer to FIG. 13, a power plant may be retrofit with certain components for combusting hydrogen. The power plant may include one or more hydrogen turbines 420. Hydrogen turbine 420 may receive hydrogen from storage tank 410. In some embodiments, the hydrogen turbine receives off-gas from the top of the hydrogen tank 410. Alternatively, hydrogen turbine may receive hydrogen from transfer line 405 directly. The one or more hydrogen turbines may combust hydrogen and generate electricity which is received by power grid 435. In some embodiments, hydrogen turbine 420 emit exhaust gases from the heat of combustion of the hydrogen. The exhaust gases may be used to heat water 425, either directly through boilers or indirectly through heat exchangers. Steam from heated water 425 may be used to drive steam turbine 430. In turn, electricity may be delivered to power grid 435.

In certain embodiments, a hydrogen pump 415 may receive and deliver hydrogen to various vessels 415. In one embodiment, a hydrogen pump 415 receives hydrogen from hydrogen tank 410 and delivers such hydrogen to vessels configured to receive hydrogen. For example, hydrogen pump 415 may be used to deliver hydrogen to hydrogen powered cars or trucks.

2. Delivering Hydrogen to Retrofit Power Plants

In some embodiments, a power plant is located on or adjacent to the coast line. Such location enables ships containing hydrogen to offload hydrogen directly to the power plant. Advantageously, such methods of offloading hydrogen directly to a hydrogen burning power plant would avoid inefficiencies of transferring hydrogen through one or more distribution means.

In particular embodiments, hydrogen is provided to a ship. Such hydrogen may be produced from wind farms as further described herein. Hydrogen transport ships may transport the hydrogen to a hydrogen burning power plant directly. In one embodiment, a hydrogen transport ship may be moored to buoys offshore. In another embodiment, the power plants may have deep water access ports capable of receiving a hydrogen transport ship. Hydrogen transport lines may be retrieved by the transport ship and hydrogen may be transferred from the ship directly to the power plant. In certain embodiments, the transport ship may offload the hydrogen through a pipeline or by other similar transfer means. In certain embodiments, the power plant comprises on-site storage tanks which receive the hydrogen.

An example of where this method would be of particular benefit is when transferring hydrogen to converted power plants along the California coast. This mooring technique could be used to transfer hydrogen to the Morro Bay plant, Diablo Cannon plant, King Harbor power plant and any other plant. In certain embodiments, the technique of mooring to buoys is beneficial where deep water ports are not available but the proximity of the plant to the ocean would allow a ship to come close and off-load hydrogen through a pipeline or other flexible lines.

D. Distribution of Hydrogen

While certain embodiments have been described above relating to storage tanks 150 within an ABS standardized or other standardized shipping container, the storage tank may also be used alone. For example, storage tank 151 (such as that shown in FIG. 11) that has saddles. This tank may be mounted onto existing fleets of trucks in a similar manner as shipping containers. In embodiments including standardized shipping containers, these may be mounted onto a trailer such as that shown in FIG. 14.

Figure 15:
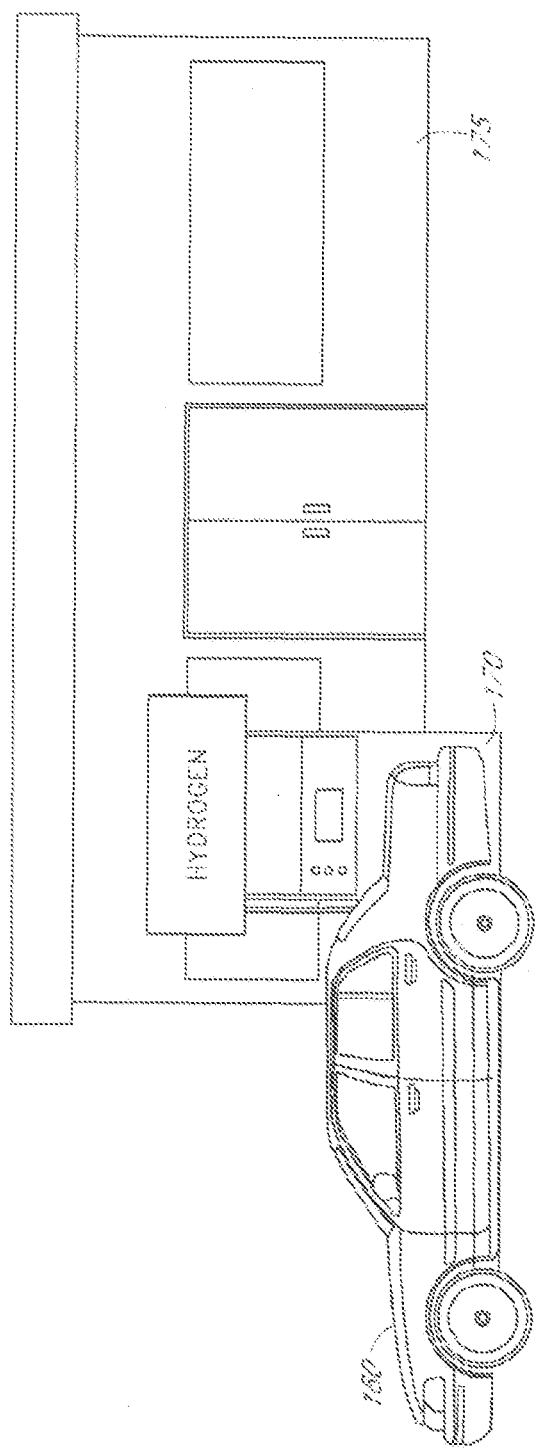
FIG. 15 illustrates one embodiment of a hydrogen filling station and pump.

The methods described above may be used to distribute hydrogen to consumers. Infrastructure for consumer use of hydrogen is currently being developed. One example of hydrogen use is in automobiles. Referring to FIG. 15, a hydrogen gas filling station 175 and pump 170 are shown. A car 180 equipped with a hydrogen fuel cell may be powered by hydrogen delivered from the hydrogen gas filling station 175. In certain embodiments, the filling station 175 may receive hydrogen from a shipping truck or through a pipeline. The filling station 175 may be equipped with underground storage tanks, above ground storage tanks, and replaceable storage tanks.

As discussed above, certain embodiments involve the shipping and distribution of hydrogen in standardized containers. Such containers may be filled at the point of generation (i.e., the hydrogen production facility) or a distribution center that receives hydrogen. In some embodiments, the containers including the hydrogen tanks may be transported to the filling station.

In certain embodiments, filling station 175 may be equipped with a hydrogen container distribution system. In some embodiments, the hydrogen container distribution system includes a plurality of slots. Each slot may accommodate one or more hydrogen shipping containers. In certain embodiments, the plurality of slots includes at least three shipping containers.

Figure 16:
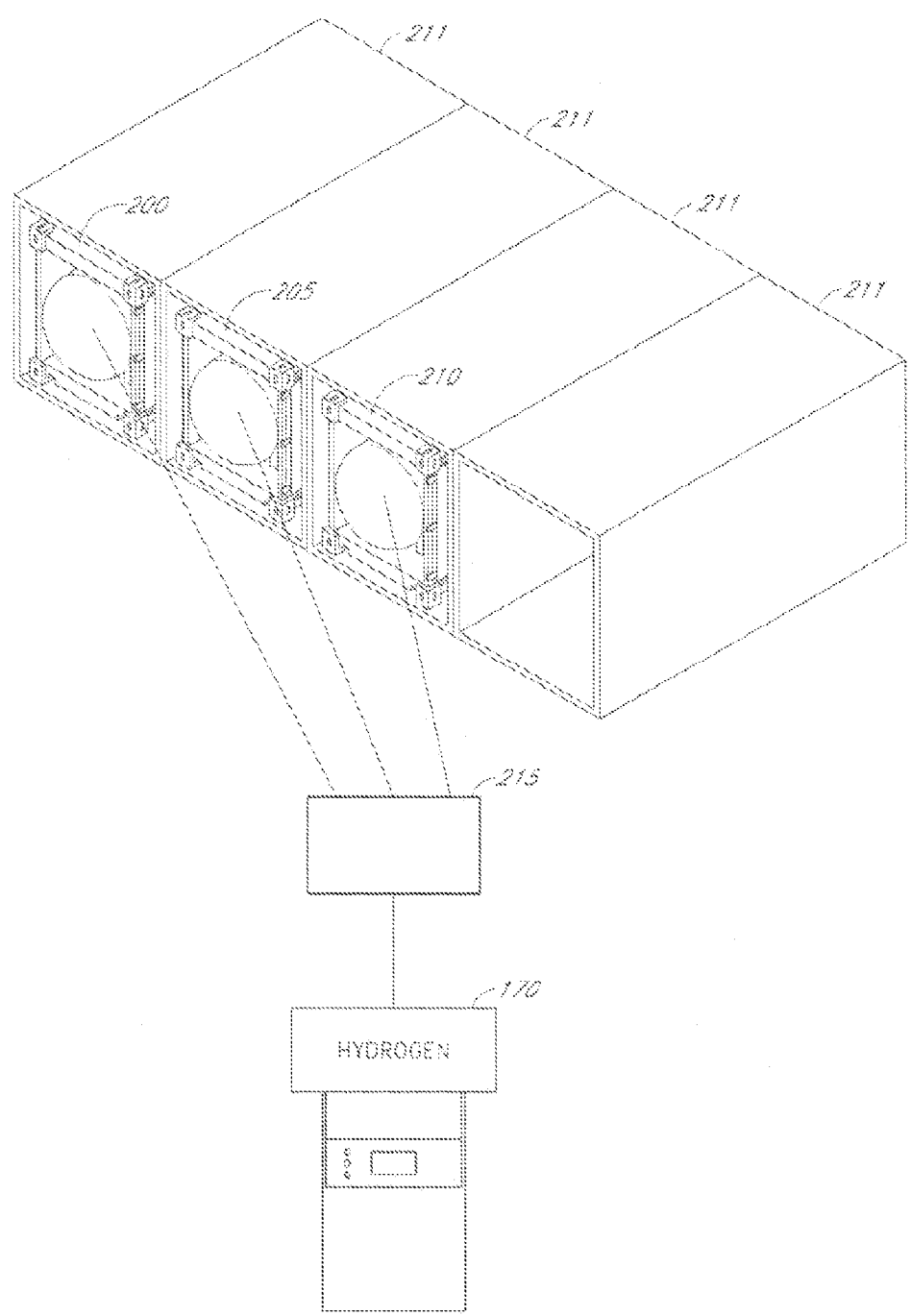
FIG. 16 is a schematic drawing of a plurality of standardized shipping containers in use at a hydrogen filling station.

Referring to FIG. 16, the filling station may include at least three standardized shipping containers 200, 205, 210. Each shipping container 200, 205, 210 includes a hydrogen storage tank 150. In certain embodiments, each shipping container is located in a slot 211, such as a garage or storage bin or shroud to restrict access to the tank Alternatively, the container 200, 205, 210 may be located on site without such slot 211. In one embodiment, one or more containers may be filled, partially filled, or empty.

Each hydrogen tank in the shipping container 200, 205, 210 may be in fluid connection with a manifold 215. Manifold 215 may selectively distribute hydrogen from the hydrogen tanks 150 to hydrogen pump 170. If one or more containers 200, 205, 210 are empty or are in the process of being removed from the slot, the manifold may select a filled container from which to receive hydrogen and deliver such hydrogen to a hydrogen pump 170. Hydrogen pump 170 may be equipped with a meter to identify the volume dispensed to a consumer. Hydrogen pump 170 may also be equipped with a payment receiving means such as a credit card or ATM card reader, or a cash input device.

A hydrogen shipping truck may be used to deliver, remove, and/or fill the hydrogen storage tank 150 in the standardized shipping containers, 200, 205, 210. In one embodiment, a hydrogen shipping truck may selectively fill one or more empty or partially filled hydrogen storage tanks 150 in containers 200, 205, 210. In other embodiments a hydrogen shipping truck may remove one or more of the empty or partially filled hydrogen storage tanks 150 in the containers 200, 205, 210. To do so, the hydrogen shipping truck, may remove the entire container 200, 205, 210 housing the empty or partially filled hydrogen storage tank 150.

Figure 17:
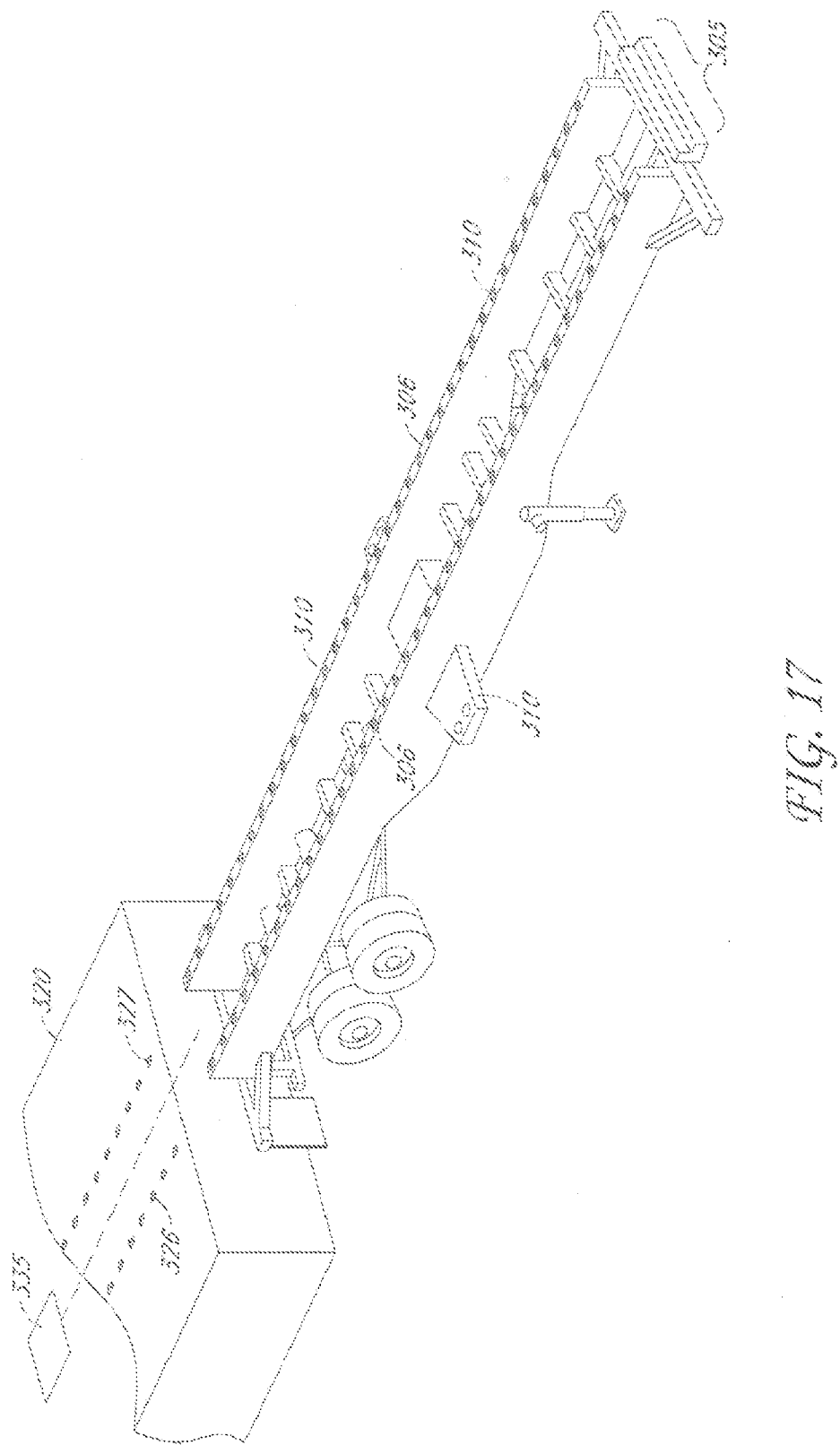
FIG. 17 is a drawing of a trailer and loading dock equipped with a rail system to facilitate loading and unloading of shipping containers having hydrogen storage tanks.

In some embodiments, shipping containers 200, 205, 210 may be transferred to a hydrogen shipping truck by standard lifting and transportation techniques. In other embodiments, a certain delivery system described in FIG. 17 may be used. Referring to FIG. 17, hydrogen shipping trailer 300 has a rail system 305 which includes at least two parallel rails 306, 307 configured to accommodate a standard shipping container 120. Each rail 306, 307 includes one or more rollers 310. The one or more rollers 310 facilitate receiving and delivering a standard shipping container 120. Upon receiving a standard shipping container, the one or more retractable rollers 310 may be retracted and the standard shipping container 120 would become stationary and supported by the rail system 305. However, in other embodiments, the rollers are not retractable and the rollers are used to support the shipping container 120. In some embodiments, the rails 306, 307 may also include a pin system 315 for affixing the shipping container 120 to the rails 306, 307.

In some embodiments, rails 306, 307 are about 2 inches wide and 8 inches tall and about 4 feet apart. However, the spacing and the size of the rails may be determined by the exact container size. In some embodiments, the containers may be equipped with wheels at each end to facilitate guiding the containers on and off the trucks.

Continuing to refer to FIG. 17, loading dock 320 may also be equipped with a rail system including one or more rails 326, 327. Loading dock rails 326, 327 are configured to be at the same height as trailer rails 306, 307 to facilitate the loading and unloading of containers at the same height. Loading dock rails may also include rollers 330, which are optionally retractable. A winch 335 or other device configured to move a standard shipping container may be used to move the standard shipping container 120 to the loading dock 320. Alternatively, a moving track such as a conveyor belt or a moving link chain may be used to move the standard shipping containers 120 to and away from the loading dock 320.

Figure 18:
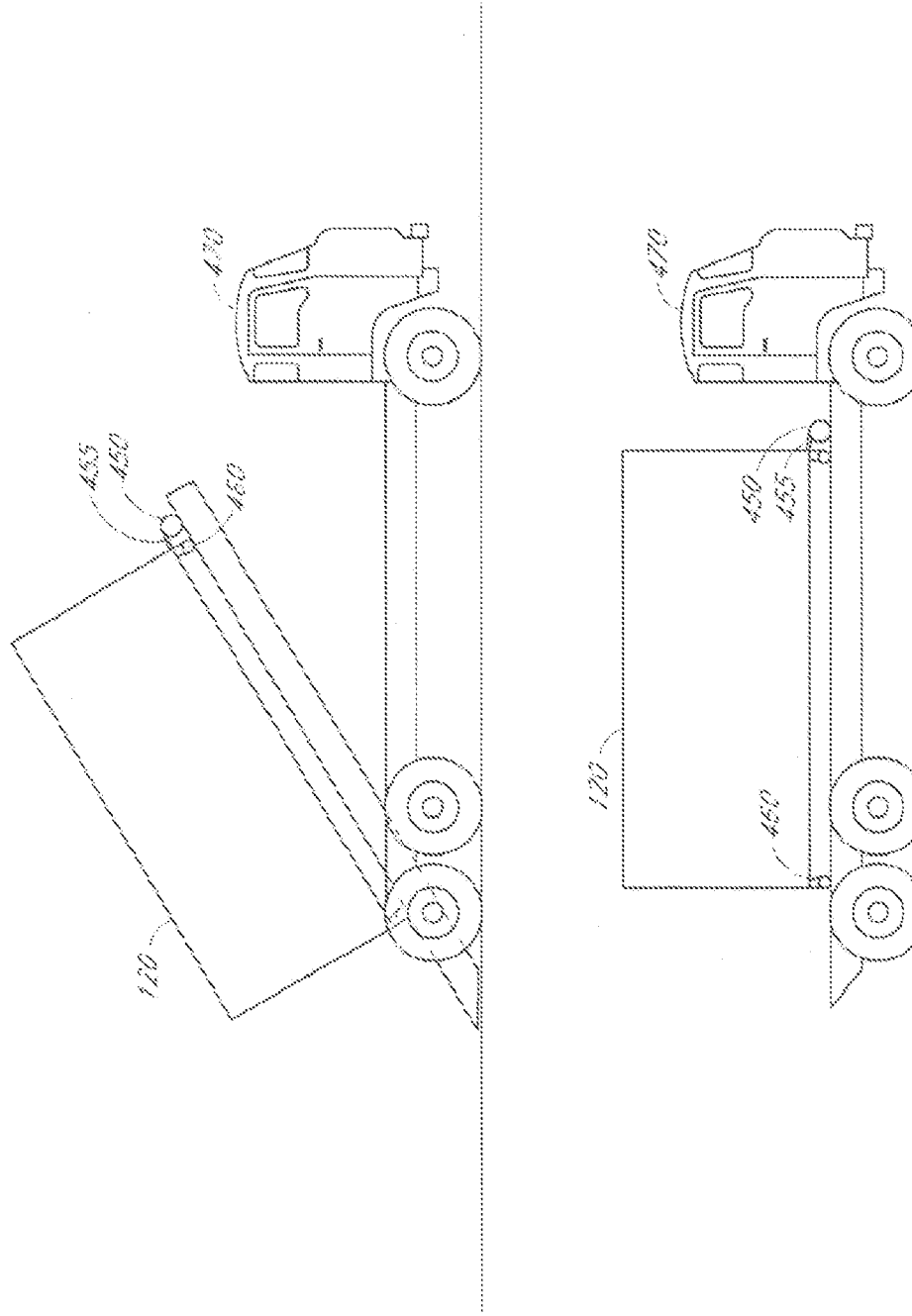
FIG. 18 illustrates one embodiment of a system on a delivery automobile for unloading standardized shipping containers.

Referring to FIG. 18, a hydrogen delivery truck 470 may be equipped with a tiltable bed trailer. A hydrogen container 120 may be positioned on and/or affixed to the delivery truck 470. In certain embodiments, container 120 may be equipped with wheels 460. In certain embodiments, wheels 460 are configured to match the corner fittings of the container. In particular embodiments, a lock and pin system may be used to affix the wheels 460 to the container. As the trailer bed is raised, the container will roll from the trailer bed to the ground or a selected delivery positions such as on a dock. The truck or trailer may further be equipped with winch 455 and cable 450 for unloading or loading of containers onto the trailer.

Figure 19:
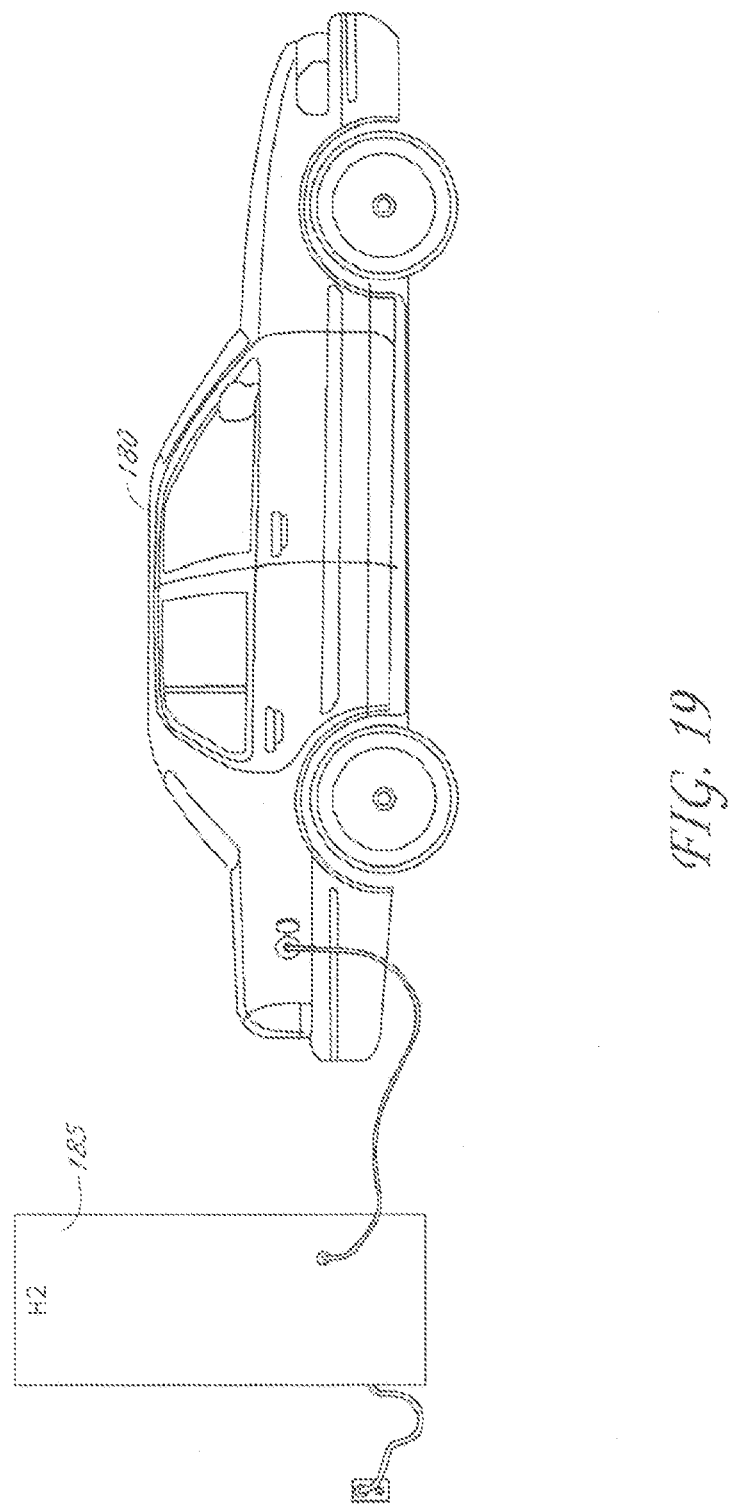
FIG. 19 illustrates an embodiment of a consumer version of a hydrogen filling station.

Some embodiments also relate to consumer use in smaller devices. Referring to FIG. 19, a portable hydrogen filling station 185 may be used to fill car 180 with hydrogen. Portable hydrogen filling station 185 may receive a container or tank of $H_2$ which can be dispensed as desired.

The various methods and techniques described above provide a number of ways to carry out the invention. Of course, it is to be understood that not necessarily all objectives or advantages described may be achieved in accordance with any particular embodiment described herein.

Furthermore, the skilled artisan will recognize the interchangeability of various features from different embodiments. Similarly, the various features and steps discussed above, as well as other known equivalents for each such feature or step, can be mixed and matched by one of ordinary skill in this art to perform methods in accordance with principles described herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A method for monitoring, controlling and distributing power output of a hydrogen producing wind farm, comprising:
    a) a power monitoring system that measures the available power output of a wind farm;
    b) a power control system that receives input from the monitoring system and performs the command and control functions required to control the output power of the wind farm;
    c) a plurality of electrolyzer control modules connected to the electrolyzers to monitor and control hydrogen production;
    d) a power distribution system that receives input from the monitoring system, which is required to allocate, balance and route the available power based on a defined computer algorithm to maximize the hydrogen production.

2. The system of claim 1, configured to work with both AC and DC input power.

3. The system of claim 2, further contains the necessary electrical transformers, rectifiers, switches, regulators, inverters to provide the optimal power (AC or DC) to the loads that are associated with the hydrogen production.

4. The system of claim 1, further comprising a low voltage DC power output controller for electrolyzers.

5. The system of claim 1, further comprising a converted diesel generator that is configured to operate on the hydrogen produced by the system and capable of producing electrical energy in a manner such that the system is self-sustaining when wind is not sufficient to generate enough electricity to sustain all functions of the system.

* * * * *